US011481035B2

(12) United States Patent
Trinh et al.

(10) Patent No.: US 11,481,035 B2
(45) Date of Patent: Oct. 25, 2022

(54) METHOD AND SYSTEM FOR PROCESSING GESTURES DETECTED ON A DISPLAY SCREEN OF A FOLDABLE DEVICE

(71) Applicants: Thu Ha Trinh, Vancouver (CA); Wei Li, Markham (CA); Jin Tang, Markham (CA); Marcello Giordano, Markham (CA); Ghazaleh Saniee-Monfared, Toronto (CA); Chenhe Li, Markham (CA); Siwen Yang, Markham (CA); Zhou Xuan, Markham (CA)

(72) Inventors: Thu Ha Trinh, Vancouver (CA); Wei Li, Markham (CA); Jin Tang, Markham (CA); Marcello Giordano, Markham (CA); Ghazaleh Saniee-Monfared, Toronto (CA); Chenhe Li, Markham (CA); Siwen Yang, Markham (CA); Zhou Xuan, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/875,957

(22) Filed: May 15, 2020

(65) Prior Publication Data
US 2021/0357034 A1 Nov. 18, 2021

(51) Int. Cl.
*G06F 3/01* (2006.01)
*G06F 3/041* (2006.01)
*G06F 3/04883* (2022.01)

(52) U.S. Cl.
CPC ............ *G06F 3/017* (2013.01); *G06F 3/0416* (2013.01); *G06F 3/04883* (2013.01); *G06F 2203/04102* (2013.01); *G06F 2203/04806* (2013.01)

(58) Field of Classification Search
CPC .... G06F 3/017; G06F 3/04883; G06F 3/0416; G06F 2203/04102; G06F 2203/04806
See application file for complete search history.

(56) References Cited

U.S. PATENT DOCUMENTS

| | | | |
|---|---|---|---|
| 9,019,170 B2 | 4/2015 | Kim | |
| 10,635,136 B2 | 4/2020 | La et al. | |
| 11,360,728 B2 * | 6/2022 | Kim | .......................... G06T 1/20 |
| 2010/0085300 A1 * | 4/2010 | Cohen | ...................... G06F 3/017 |
| | | | 345/156 |

(Continued)

FOREIGN PATENT DOCUMENTS

WO 2020080639 A1 4/2020

*Primary Examiner* — Ibrahim A Khan

(57) ABSTRACT

System and method for managing a user interface for a foldable device are disclosed. The method includes: determining a folding state of the foldable device based on a folding angle of the foldable device; detecting an input gesture on one or more touch-sensitive display segments of a flexible display screen of a foldable device; determining a gesture type corresponding to the detected input gesture; determining whether the detected input gesture is a valid gesture or invalid gesture; and responsive to determining that the detected input gesture is a valid gesture, providing the gesture type corresponding to the detected gesture, the folding state of the foldable device, and display information to a software application or an operating system of the foldable device.

20 Claims, 19 Drawing Sheets

(56) References Cited

U.S. PATENT DOCUMENTS

| | | | |
|---|---|---|---|
| 2011/0069021 A1* | 3/2011 | Hill | G06F 3/04883 345/173 |
| 2012/0131516 A1* | 5/2012 | Chiu | G06F 3/04883 715/863 |
| 2013/0077236 A1* | 3/2013 | Becze | G06F 3/04883 361/679.56 |
| 2013/0141373 A1* | 6/2013 | Takuma | G06F 3/04883 345/173 |
| 2013/0265221 A1* | 10/2013 | Lee | H04N 21/4222 345/156 |
| 2013/0300697 A1 | 11/2013 | Kim et al. | |
| 2013/0321340 A1* | 12/2013 | Seo | G06F 3/04883 345/174 |
| 2013/0342509 A1* | 12/2013 | Kang | G06F 3/0416 345/174 |
| 2014/0015743 A1* | 1/2014 | Seo | G06F 3/3262 345/156 |
| 2014/0028596 A1* | 1/2014 | Seo | G06F 3/0481 345/173 |
| 2014/0035869 A1* | 2/2014 | Yun | G06F 1/1652 345/174 |
| 2014/0055429 A1* | 2/2014 | Kwon | G09G 3/035 345/204 |
| 2014/0078046 A1* | 3/2014 | Seo | G06F 1/1652 345/156 |
| 2014/0132626 A1* | 5/2014 | Shih | G06F 3/0483 345/660 |
| 2014/0215382 A1* | 7/2014 | Engel | G06F 3/04883 715/863 |
| 2014/0320393 A1* | 10/2014 | Modarres | G06F 3/0483 345/156 |
| 2015/0130738 A1* | 5/2015 | Park | G06F 3/1423 345/173 |
| 2015/0227271 A1* | 8/2015 | Kang | H04M 1/72469 715/781 |
| 2016/0026219 A1* | 1/2016 | Kim | G06F 1/1641 345/173 |
| 2016/0070305 A1* | 3/2016 | Kim | G06F 3/0412 345/173 |
| 2016/0162241 A1 | 6/2016 | An et al. | |
| 2016/0179236 A1* | 6/2016 | Shin | G06F 3/0487 345/173 |
| 2016/0187994 A1* | 6/2016 | La | G06F 1/1677 345/619 |
| 2017/0034320 A1* | 2/2017 | Stewart | G06F 1/1684 |
| 2017/0090596 A1 | 3/2017 | Silvanto et al. | |
| 2018/0275763 A1* | 9/2018 | Kim | G06F 3/04845 |
| 2018/0341341 A1* | 11/2018 | Sharma | G06F 3/04886 |
| 2019/0012000 A1* | 1/2019 | Cavallaro | G06F 1/1626 |
| 2019/0259351 A1 | 8/2019 | Yoon et al. | |
| 2020/0192547 A1* | 6/2020 | Kim | G06F 1/1641 |
| 2020/0225848 A1* | 7/2020 | Yoon | G06F 1/1626 |
| 2020/0264826 A1* | 8/2020 | Kwon | G06F 3/0416 |
| 2020/0333932 A1* | 10/2020 | Lee | G06F 1/1652 |

* cited by examiner

| FOLDING ANGLE | AVAILABLE GESTURE SET FOR DISPLAY SEGMENTS (301, 302) | AVAILABLE GESTURE SET FOR EDGE DISPLAY SEGMENT (303) |
|---|---|---|
| 0° TO A1 | CROSS- SEGMENT DOUBLE SWIPE, CROSS- SEGMENT COMPOUND SWIPE, MULTI-SEGMENT MULTI-SWIPE | TAP, SWIPE, PINCH/ZOOM, CROSS-SEGMENT DOUBLE SWIPE, CROSS-SEGMENT COMPOUND SWIPE, MULTI-SEGMENT MULTI-SWIPE |
| A1 TO A2 < 90° | CROSS- SEGMENT COMPOUND SWIPE, MULTI-SEGMENT MULTI-SWIPE, ROTATION | TAP, HARD TAP, SWIPE, PINCH/ZOOM, CROSS- SEGMENT COMPOUND SWIPE, MULTI-SEGMENT MULTI-SWIPE |
| A2 TO A3 ≥ 90° | TAP, HARDTAP, PINCH/ZOOM, CROSS- SEGMENT SINGLE SWIPE, CROSS- SEGMENT DOUBLE SWIPE, CROSS-SEGMENT COMPOUND SWIPE, MULTI-SEGMENT MULTI-SWIPE, ROTATION | TAP, HARD TAP, SWIPE, PINCH/ZOOM, CROSS- SEGMENT SINGLE SWIPE, CROSS- SEGMENT DOUBLE SWIPE, CROSS- SEGMENT COMPOUND SWIPE, MULTI-SEGMENT MULTI-SWIPE, ROTATION |
| A3 TO A4 | HARD TAP, ROTATION | ROTATION |
| A4 TO 180° | TAP, HARD TAP, SWIPE, PINCH/ZOOM, CROSS- SEGMENT SINGLE SWIPE, CROSS-SEGMENT DOUBLE SWIPE, CROSS- SEGMENT COMPOUND SWIPE, MULTI-SEGMENT MULTI-SWIPE, ROTATION | TAP, HARD TAP, SWIPE, PINCH/ZOOM, CROSS- SEGMENT SINGLE SWIPE, CROSS- SEGMENT DOUBLE SWIPE, CROSS- SEGMENT COMPOUND SWIPE, MULTI-SEGMENT MULTI-SWIPE, ROTATION |

FIG. 5

| FOLDING ANGLE | MAIN SEGMENTS (301, 302) | USE CASE EXAMPLE | EDGE (303) | USE CASE EXAMPLE |
|---|---|---|---|---|
| 0° TO A1 | NO | N/A | YES | RENDER RECENTLY CLOSED APPS PLACED ON THE EDGE |
| A1 TO A2 < 90° | NO | N/A | YES | RENDER RECENTLY CLOSED APPS PLACED ON THE EDGE |
| A2 TO A3 ≥ 90° | YES | TAP ON THE BACK BUTTON | YES | TAP ON EDGE UI ITEMS |
| A3 TO A4 | NO | N/A | NO | N/A |
| A4 TO 180° | YES | TAP ON AN APP ICON TO OPEN THE APP | YES | TAP ON AN APP ICON TO OPEN THE APP |

| FOLDING ANGLE | MAIN SEGS. (301, 302) | USE CASE EXAMPLE | EDGE (303) | USE CASE EXAMPLE |
|---|---|---|---|---|
| 0° TO A1 | NO | NA | NO | NA |
| A1 TO A2 < 90° | NO | NA | YES | CONFIRM PREVIOUS GESTURE BY PERFORMING A LONG PRESS ON EDGE INSTEAD OF TOUCHING THE MAIN SCREENS THAT ARE UNSTABLE IN THIS ANGLE |
| A2 TO A3 ≥ 90° | YES | STANDARD HARD TAP ON PHONE'S HAPTIC TOUCH | YES | PERFORM A HARD TOUCH ON EDGE TO DECIDE WHICH RECENTLY OPENED APPS CAN BE CLOSED |
| A3 TO A4 | YES | STANDARD HARD TAP ON PHONE'S HAPTIC TOUCH | NO | N/A |
| A4 TO 180° | YES | STANDARD HARD TAP ON PHONE'S HAPTIC TOUCH | YES | ANY OF THE ABOVE SCENARIOS |

| FOLDING ANGLE | MAIN SEGMENTS (301, 302) | USE CASE EXAMPLE | EDGE (303) | USE CASE EXAMPLE |
|---|---|---|---|---|
| 0° TO A1 | NO | N/A | YES | SWIPE UP ON THE EDGE TO ACCEPT/REJECT AN INCOMING CALL |
| A1 TO A2 < 90° | NO | N/A | YES | GO TO NEXT/PREV SONG |
| A2 TO A3 ≥ 90° | YES | GO TO NEXT/PREV PHOTOS | YES | GO TO NEXT/PREV SONG |
| A3 TO A4 | NO | N/A | NO | N/A |
| A4 TO 180° | YES | GO TO NEXT/PREV PHOTOS | YES | GO BACK AND FOURTH IN A VIDEO |

| FOLDING ANGLE | MAIN SEGMENTS (301, 302) | USE CASE EXAMPLE | EDGE (303) | USE CASE EXAMPLE |
|---|---|---|---|---|
| 0° TO A1 | NO | N/A | YES | PINCH ON EDGE TO LOCK THE SCREEN |
| A1 TO A2 < 90° | NO | N/A | YES | GO TO NEXT/PREV SONG |
| A2 TO A3 ≥ 90° | YES | GO TO NEXT/PREV PHOTOS | YES | GO TO NEXT/PREV SONG |
| A3 TO A4 | NO | N/A | NO | N/A |
| A4 TO 180° | YES | ZOOM INTO PHOTOS | YES | PERFORM A PINCH OUT GESTURE ON EDGE BAR TO SEE MORE OPTION MENUS ON EDGE |

FIG. 9

| FOLDING ANGLE | POSSIBILITY TO RUN | EXAMPLE USE CASES |
|---|---|---|
| 0° TO A1 | NO | N/A |
| A1 TO A2 < 90° | NO | N/A |
| A2 TO A3 ≥ 90° | YES | SWIPE A NOTIFICATION SHOWN ON EDGE TO THE BACK (DISMISS). |
| A3 TO A4 | NO | N/A |
| A4 TO 180° | YES | REGULAR SWIPE |

| FOLDING ANGLE | POSSIBILITY TO RUN | EXAMPLE USE CASES |
|---|---|---|
| 0° TO A1 | YES | FAST SWIPE BY HOLDING INDEX FINGER ON EDGE AND SWIPE WITH THUMB |
| A1 TO A2 < 90° | NO | N/A |
| A2 TO A3 ≥ 90° | YES | BOOKMARK A WEBSITE ONTO THE EDGE BY HOLDING THE INDEX FINGER ON EDGE AND SWIPING THUMB UPWARDS |
| A3 TO A4 | NO | N/A |
| A4 TO 180° | YES | REGULAR HOLD AND DRAG GESTURE ON FLAT DEVICES. |

FIG. 13

| FOLDING ANGLE | POSSIBILITY TO RUN | EXAMPLE USE CASES |
|---|---|---|
| 0° TO A1 | YES | AUTOMATICALLY SHOW SHARE OPTIONS WHENEVER THE USER PERFORMS A CROSS-SEGMENT COMPOUND SWIPE ON A SHARP ANGLE |
| A1 TO A2 < 90° | NO | N/A |
| A2 TO A3 ≥ 90° | YES | MERGE TWO SCREENS |
| A3 TO A4 | NO | N/A |
| A4 TO 180° | YES | REGULAR PINCH ON FLAT DEVICES |

FIG. 15

| FOLDING ANGLE | POSSIBILITY TO RUN | EXAMPLE USE CASES |
|---|---|---|
| 0° TO A1 | YES | FAST SCROLL |
| A1 TO A2 < 90° | YES | FAST SCROLL |
| A2 TO A3 ≥ 90° | YES | FAST SCROLL/LARGE ZOOM |
| A3 TO A4 | NO | N/A |
| A4 TO 180° | YES | TWO-FINGER SWIPE |

FIG. 17

| FOLDING ANGLE | MAIN SEGMENTS (301, 302) | USE CASE EXAMPLE | EDGE (303) | USE CASE EXAMPLE |
|---|---|---|---|---|
| 0° TO A1 | NO | NA | NO | N/A |
| A1 TO A2 < 90° | YES | STANDARD ROTATION OF A PHOTO | NO | N/A |
| A2 TO A3 ≥ 90° | YES | STANDARD ROTATION OF A PHOTO | YES | SWAP THE TWO SCREENS |
| A3 TO A4 | YES | SWITCH BETWEEN APPLICATIONS | YES | SWAP THE TWO SCREENS |
| A4 TO 180° | YES | STANDARD ROTATION OF A PHOTO | YES | STANDARD ROTATION OF A PHOTO |

METHOD AND SYSTEM FOR PROCESSING GESTURES DETECTED ON A DISPLAY SCREEN OF A FOLDABLE DEVICE

FIELD

The present application relates generally to mobile devices that have a flexible display screen and, more specifically, to a method and system for processing gestures detected on the flexible display screen of such mobile devices.

BACKGROUND

Over the past few years, there has been an increasing research and commercial interest in the development of mobile phones that have a flexible display screen which can be folded or deformed into different form factors (hereinafter referred to as a foldable device).

A foldable device can have two screens and thereby be shared by multiple users of the foldable device. For example, a first user may control a user interface displayed on a first screen of the device while a second user may control another user interface displayed on a second screen of the device. While foldable devices opens up multi-user interaction capabilities, appropriate methods and technologies are desired to recognize user control on multiple screens, and to support both single-user and multi-user scenarios.

SUMMARY

According to one aspect of the present disclosure there is provided a foldable device comprising a flexible display screen, a processor, and a memory storing instructions which when executed by the processor cause the foldable device to execute instructions to: determine a folding angle of the foldable device, detect a gesture performed on one or more touch-sensitive display segments, determine a type of the detected gesture, and determine whether or not the type of gesture is in the set of available gestures for the determined folding angle. If and when the gesture is present in the set of available gestures for the determined folding angle, the gesture recognition system provides the detected gesture to an application running on the device. The application running on the device can then cause the processor of the foldable device to perform an action in response to receiving the detected gesture. The application running on the device may include a mapping table between a set of predefined gestures and corresponding actions to be performed by the application.

The available gestures included in a set of available gestures for user interaction with a foldable device may be reduced to only those gestures appropriate for interaction with the foldable device for the folding state of the foldable device. The folding state of the foldable device depends on the physical configuration of the foldable device (i.e., the form factor of foldable device). The folding state of the foldable device is determined based on a folding angle of the foldable device. In operation, a determination may be made to establish the folding angle of the foldable device. Based on the determined folding angle of the foldable device, the foldable device may accept or ignore an input gesture detected on one or more touch-sensitive display segments of the flexible display screen. Limiting acceptable input gestures based on the folding angle of the display of the foldable device allows the foldable device to more quickly and efficiently recognize a valid input gesture, especially in a multi-user scenario, as well as to better process the input gesture and respond accordingly. The disclosed embodiments can also minimize user fatigue when using the foldable device for prolonged period, and improve user experience when multiple applications are running on the foldable device, and each application may interpret and process an input gesture to determine an action to be performed.

According to another aspect of the present disclosure, there is provided a method that includes determining a folding state of the foldable device based on a folding angle of the foldable device and detecting an input gesture on one or more touch-sensitive display segments of a flexible display screen of a foldable device. The method further includes determining a gesture type corresponding to the detected input gesture, determining whether the detected input gesture is a valid gesture or invalid gesture, and responsive to determining that the detected input gesture is a valid gesture, providing the gesture type corresponding to the detected gesture, the folding state of the foldable device, and display information to a software application or an operating system of the foldable device.

In accordance with the preceding aspect, the method further includes responsive to determining that the gesture type of the detected input gesture is an invalid gesture, ignoring the detected input gesture.

In accordance with any of the preceding aspects, determining whether the detected input gesture is a valid input gesture or an invalid input gesture comprises: retrieving a set of available input gestures corresponding to the folding state of the foldable device; and determining that the detected input gesture is a valid input gesture in response to determining that the detected input gesture is included in the set of available input gestures corresponding to the folding state of the foldable device.

In accordance with any of the preceding aspects, detecting an input gesture on one or more touch-sensitive display segments of a flexible display screen of a foldable device comprises detecting a gesture on only one of the touch-sensitive display segments, and wherein determining a gesture type corresponding to the detected input gesture comprises determining that the input gesture is a simple input gesture.

In accordance with the preceding aspect, the simple input gesture is one of a tap gesture, a hard tap gesture, a swipe gesture, a rotation gesture, a zoom gesture and a pinch gesture.

In accordance with of the preceding aspect, determining whether the detected input gesture is a valid input gesture or an invalid input gesture comprises: determining which one of the touch-sensitive display segments the detected input gesture was detected on; and determining that the detected input gesture is a valid input gesture when the detected input gesture is included in a subset of the set of available corresponding to the folding state of the foldable device for the one display segment the detected input gesture was detected on.

In accordance with at least some of the preceding aspects, detecting an input gesture on one or more touch-sensitive display segments of a flexible display screen of a foldable device comprises detecting a gesture on at least two of the touch-sensitive display segments, and wherein determining a gesture type corresponding to the detected input gesture comprises determining that the input gesture is a complex input gesture.

In accordance with the preceding aspect, the complex input gesture is one of a cross-segment single swipe gesture, a cross-segment double swipe gesture, a cross-segment compound swipe gesture, a multi-segment multi-swipe gesture.

In accordance with any the preceding aspect, detecting an input gesture on one or more touch-sensitive display segments of a flexible display screen of a foldable device a gesture comprises detecting input parameters for the detected input gesture and wherein the gesture type corresponding to the detected input gesture is determined based on input parameters for the detected input gesture.

According to another aspect of the present disclosure, there is provided a foldable device, which include: a fold detector configured to detect a folding angle for the foldable device, a flexible display screen comprising one or more touch-sensitive display segments, a processor, and a memory storing instructions. The instructions stored in memory, when executed by the processor cause the foldable device to: determine a folding state of the foldable device based on the folding angle of the foldable device; detect an input gesture on one or more touch-sensitive display segments of a flexible display screen of a foldable device; determine a gesture type corresponding to the detected input gesture; determine whether the detected input gesture is a valid gesture or invalid gesture; and responsive to a determination that the detected input gesture is a valid gesture, provide the gesture type corresponding to the detected gesture, the folding state of the foldable device, and display information to a software application or an operating system of the foldable device.

According to yet another aspect of the present disclosure, there is provided a non-transitory computer-readable medium storing instructions which, when executed by a processor of a foldable device cause the foldable device to: determine a folding state of the foldable device based on a folding angle of the foldable device; detect an input gesture on one or more touch-sensitive display segments of a flexible display screen of a foldable device; determine a gesture type corresponding to the detected input gesture; determine whether the detected input gesture is a valid gesture or invalid gesture; and responsive to a determination that the detected input gesture is a valid gesture, provide the gesture type corresponding to the detected gesture, the folding state of the foldable device, and display information to a software application or an operating system of the foldable device.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which:

FIG. 5 illustrates a table of available gesture sets corresponding to each of the folding states defined in FIG. 4 in accordance with aspects of the present application;

FIG. 6 illustrates a table for a tap gesture when the foldable device is in the folding states defined in FIG. 4 in accordance with aspects of the present application;

FIG. 7 illustrates a table for a hard tap gesture when the foldable device is in the folding states defined in FIG. 4 in accordance with aspects of the present application;

FIG. 8 illustrates a table for a swipe gesture when the foldable device is in the folding states defined in FIG. 4 in accordance with aspects of the present application;

FIG. 9 illustrates a table for pinch or zoom gestures when the foldable device is in the folding states defined in FIG. 4 in accordance with aspects of the present application;

FIG. 11 illustrates a table for a cross-segment single swipe gesture when the foldable device is in the folding states defined in FIG. 4 in accordance with aspects of the present application;

FIG. 13 illustrates a table for a cross-segment double swipe gesture when the foldable device is in the folding states defined in FIG. 4 in accordance with aspects of the present application;

FIG. 15 illustrates a table for a cross-segment compound swipe gesture when the foldable device is in the folding states defined in FIG. 4 in accordance with aspects of the present application;

FIG. 17 illustrates a table for a multi-segment swipe gesture when the device is in the folding states defined in FIG. 4 in accordance with aspects of the present application; and FIG. 18 illustrates a table for a rotation gesture when the device is in the folding states defined in FIG. 4 in accordance with aspects of the present application.

DETAILED DESCRIPTION

Figure 1:
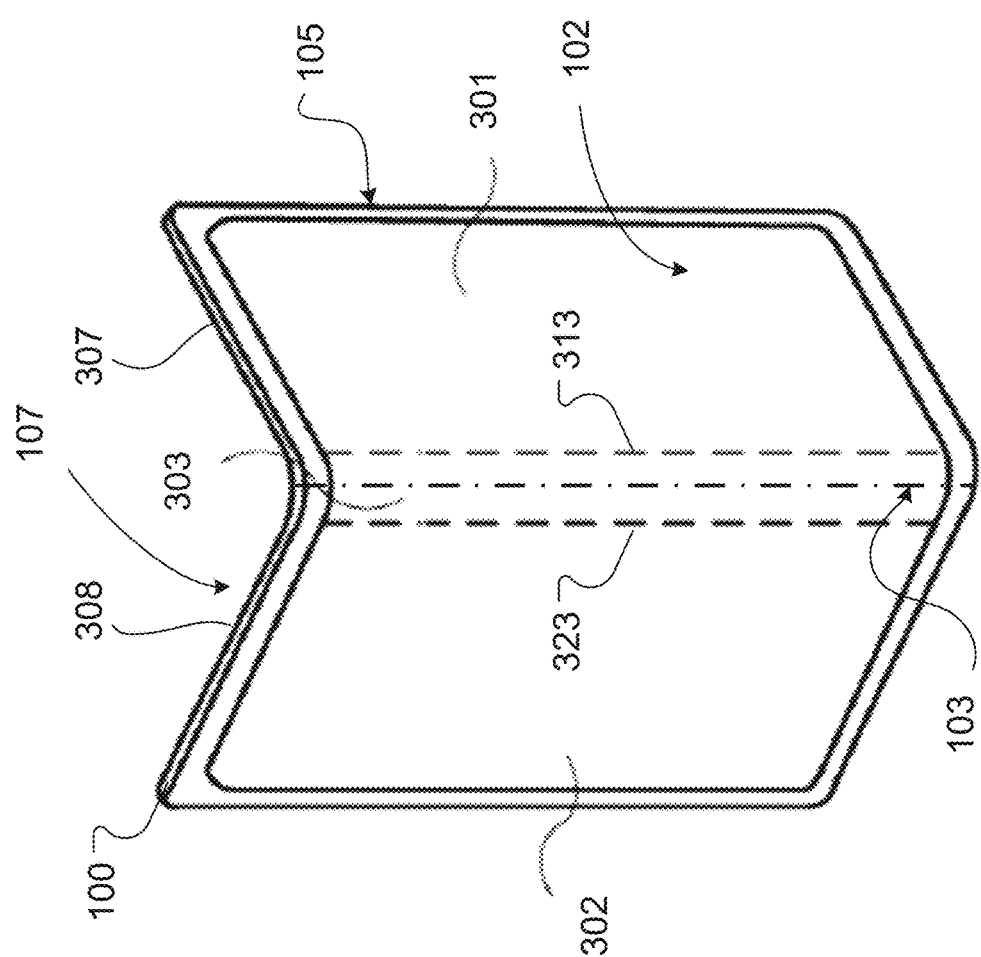
FIG. 1 illustrates a front view of a foldable device in accordance with aspects of the present application.

Referring to FIG. 1, FIG. 2A, FIG. 2B, and FIG. 3, an example embodiment of a foldable device 100 is shown. The foldable device 100 is a mobile communication device that can be used to communicate with one or more communication networks. The foldable device 100 may be used for both wireless voice communication and wireless data communication.

The foldable device 100 includes a body 105, which may be formed of plastic, glass, fiber, stainless steel, aluminum, other suitable materials, or a combination of any of these materials. The body 105 encloses multiple components, of the foldable device 100 including a processor 202 that controls the overall operation of the foldable device 100. The processor 202 is coupled to and interacts with memory 204, a flexible touch-sensitive display screen 102 (hereinafter referred to as flexible display screen 102), and a fold detector 208. The body 105 is configured to house and expose the flexible display screen 102. The foldable device 100 also includes a back 107 having a first back portion 307 and a second back portion 308. The flexible display screen 102 is manufactured from materials that enable the flexible display screen 102 to be folded along a folding edge 103, such as flexible polymer. The flexible display screen 102 enables the foldable device 100 to be folded into various physical configurations (or form factors), including a flat configuration. The flexible display screen 102 can bend, curve or fold along the folding edge 103 so that the first back portion 307 and the second back portion 308 of the foldable device 100 move towards each other. The folding edge 103 may be referred to as a hinge, and may be manufactured from a bendable, flexible material such as flexible polymer.

The flexible display screen 102 of the foldable device 100 has three touch-sensitive display segments, labeled: a first touch-sensitive display segment 301 (hereinafter referred to as first display segment 301), a second touch-sensitive display segment 302 (hereinafter referred to as second display segment 302), and an edge touch-sensitive display segment 303 (hereinafter referred to as edge display segment 303). As shown in FIG. 1, borders 313, 323 between the first, second, and edge display segments 301, 302, 303. There is a first border 313 between the first display segment 301 and the edge display segment 303. There is also a second border 323 between the second display segment 302 and the edge display segment 303. The first and second borders 313, 323 may not be physical borders, but rather may be logically defined and may be dynamically shifted (or omitted). It should be understood that when the foldable device 100 is in an unfolded state, which means that the foldable device 100 is a flat device with the folding angle 205 having an angle of 180 degrees, the first, second, and edge display segments 301, 302 and 303 are not distinguishable and the form a continuous display.

Figure 2A:
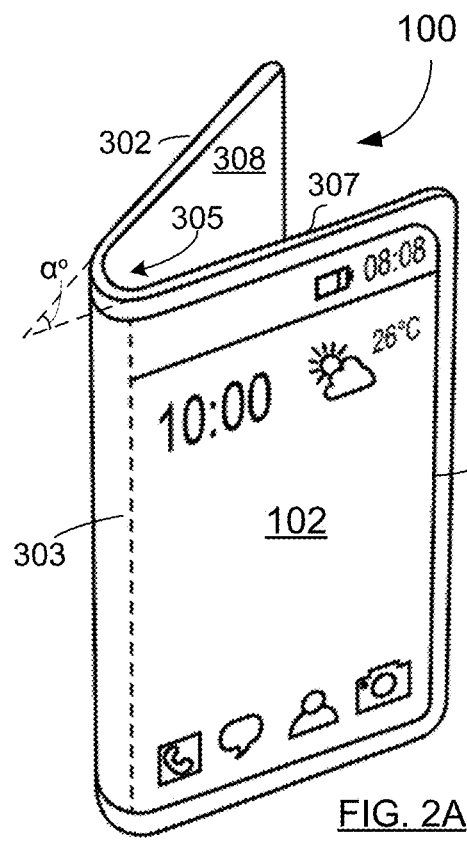
FIG. 2A illustrates a perspective view of the foldable device of FIG. 1 in accordance with aspects of the present application.
Figure 2B:
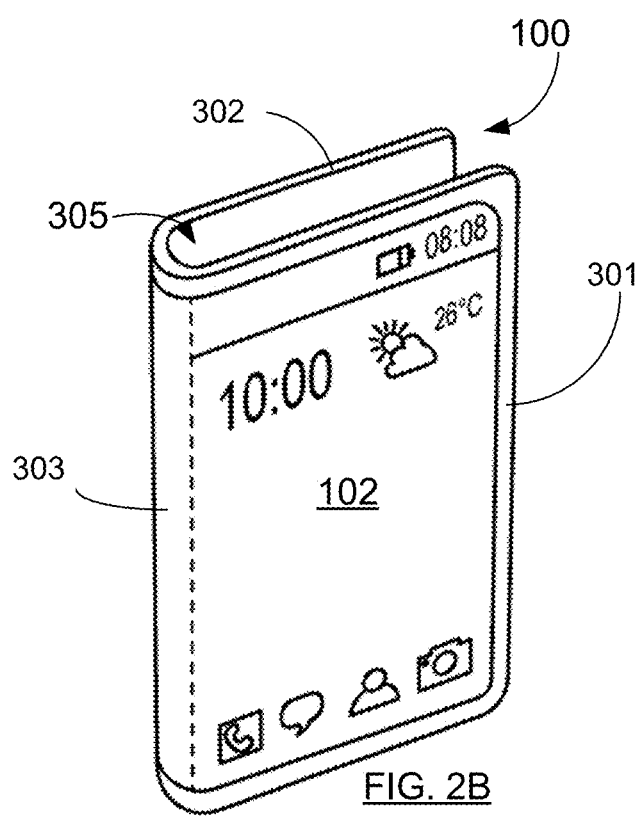
FIG. 2B illustrates a perspective view of the foldable device of FIG. 1 in a folded state in accordance with aspects of the present application.

Referring to FIG. 2A, a perspective view of the foldable device 100 is shown. The foldable device 100 can be folded along the folding edge 103 to an angle 305, which may be referred to as a folding angle 305, for example, by a user griping the first and second display segments 301, 303 and moving the back of the flexible display screen 102 towards each other. The folding angle 305 is an angle as measured between the first back portion 307 and the second back portion 308. The folding angle 305 may be acute, obtuse, right, straight or reflex. In FIG. 2A, the foldable device 100 is shown as having a folding angle 305 of a degrees. In FIG. 2B, the foldable device 100 is shown in a folded state in which the folding angle 305 is 0 degrees.

Referring again to FIG. 3, the fold detector 208 is configured to determine the folding angle 305 and provide data indicative of the folding angle 305 to the processor 202. The fold detector 208 is configured to determine the folding angle 305 based on the proximity of the first back portion 307) of the foldable device 100 to he second back portion 308 of the foldable device 100. The fold detector 208 provides data indicative of the folding angle 305 to the processor 202. In an embodiment, the fold detector 208 is a proximity sensor (otherwise known as a depth sensor). The proximity sensor may include an infrared (IR) transmitter receiver pair disposed on the first back portion 307. The IR transmitter of the IR transmitter-receiver pair can be a light-emitting diode (LED) that is configured to emit IR light. IR light emitted by the IR transmitter is reflected by the second back portion 308. The reflected IR light is detected by the IR receiver of the IR transmitter-receiver pair. The folding angle 305 can then be determined based on the time between the IR light being transmitted by the IR transmitter and the reflected IR light being received by the IR receiver. The proximity sensor may also be referred to as a depth sensor. It will be appreciated that the proximity sensor may be disposed on the second back portion 308 instead of the first back portion 307 to determine the folding angle 305 of the foldable device 100.

Alternatively, the proximity sensor may include an optical an optical transmitter-receiver pair disposed on the first back portion 307. The optical transmitter of the optical transmitter-receiver pair can be a light-emitting diode (LED) that is configured to emit light. Light emitted by the optical transmitter is reflected by the second back portion 308. The reflected light is detected by the optical receiver of the optical transmitter-receiver pair. The folding angle 305 can then be determined based on the time between the light being transmitted by the optical transmitter and the reflected light being received by the optical receiver.

In yet another implementation of the proximity detector may include a radio transmitter-receiver pair disposed on the first back portion 307. The radio transmitter of the radio transmitter-receiver pair is configured to a radio signal that is reflected by the second back portion 308. The reflected radio signal is detected by the radio receiver of the radio transmitter-receiver pair. The folding angle 305 can then be determined based on the time between the radio signal being transmitted by the radio transmitter and the reflected light being received by the radio receiver.

In still another embodiment, the fold detector 208 may include accelerometer or gyroscope. In this embodiment, fold detector 208 is disposed on the body 105 of the foldable device 100. The accelerometer or gyroscope is configured to sense an orientation of the device, and the fold detector 208 is configured to determine to determine the folding angle 305 based on the detected orientation of the foldable device 100 and provides data indicative of the folding angle 305 to the processor 202.

In another embodiment, the fold detector 208 may receive a digital image captured by a camera (not shown) of the foldable device 100 to determine the folding angle 305 of the foldable device 100. In this embodiment, the camera (not shown) is disposed on the first back portion of the foldable device 100 and captures a digital image of the second 308 back portion of the foldable device 100. The fold detector 208 process the captured image using known computer vision techniques to determine the folding angle 305 of the foldable device 100 and provides data indicative of the folding angle 305 to the processor 202.

In still another embodiment, the fold detector 208 may include a flex sensor configured to detect a folding angle 305. In this embodiment, the fold detector 208 is attached along the foldable edge 103 of the foldable device 100 (e.g., along the non-display side of the edge display segment 303). As the foldable device 100 is folded, the flex sensor measure an amount of deflection or bending of the foldable edge 103 based on a resistance reading, which is proportional to how much the flex sensor is bent as part of the foldable edge 103 of the foldable device 100.

As mentioned above, the foldable device 100, when folded has three display segments 301, 302, and 303. Each of the three touch-sensitive display segments (e.g. the first display segment 301, the first display segment 302, and the edge display segment 303) is a different segment (i.e. portion) of the flexible display screen 102 on which one or more graphical user interfaces may be rendered that include various user interface elements. For example, a different graphical user interfaces may be rendered on each of the first, second, and edge display segments 301, 302, 303. Alternatively, a first graphical user interface may be rendered on both the first display segment 301 and the second display segment 302, and a second graphical user interface may be rendered on the edge display segment 303.

A user can interact with the flexible display 102 by touching one or more of the first, second, and edge segments 301, 302, 303 with one or more fingers and performing a gesture. The user can use single touch gesture or a multi-touch gesture to interact with the foldable device 100. A gesture recognition system 206, which forms part of an operating system (OS) (not shown) of the foldable device 100, is configured to detect a gesture that is performed by a user one or more of first, second, and edge display segments 301, 302, 303. A gesture performed by a user on one or more of the first, second, and third display segments 301, 302, 303 to interact with the foldable device 100 and detected by the gesture detection system 206 is referred to herein as an input gesture. An input gesture may be simple input gesture or a complex input gesture. In the present disclosure, a simple input gesture is defined as a gesture performed by a user on only one of the first, second, and edge display segments 301, 302, 303, and a complex gesture is defined as a gesture that is performed by a user on two or more of the segments 301, 302, 303. For example, a simple gesture may be a long press gesture, a tap gesture, a hard tap gesture, a swipe gesture, a rotation gesture or a pinch gesture performed on one of the first, second, and edge display segments 301, 302, 303 of the display screen 102. A complex input gesture may be a cross-segment single swipe gesture, cross-segment double swipe gesture, cross-segment compound swipe gesture, or multi-segment swipe gesture.

Figure 4:
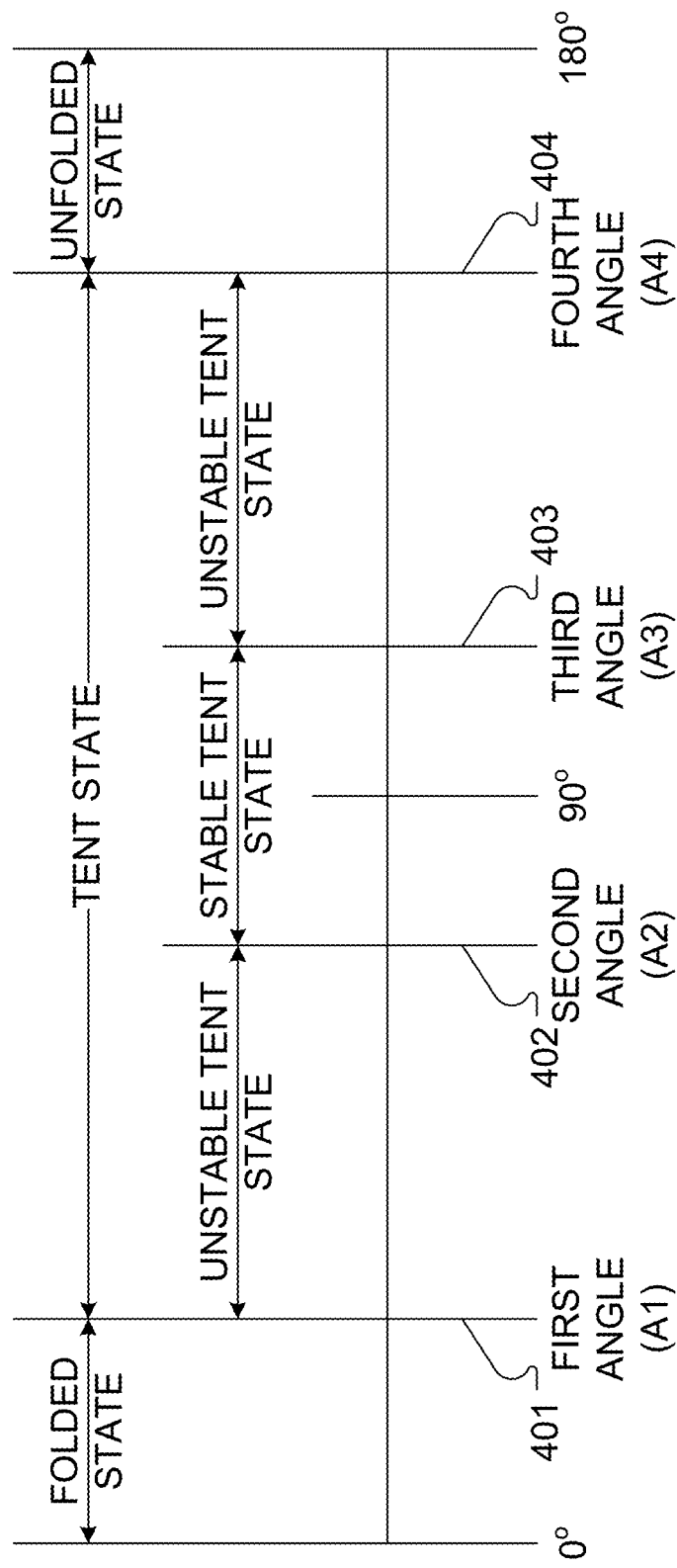
FIG. 4 illustrates example folding states of the foldable device of FIG. 1 in accordance with aspects of the present application.

Referring now to FIG. 4, which is a chart illustrating various example folding states of the foldable device 100 in accordance with aspects of the present application. The term "folding state" in this disclosure is used to refer a physical configuration of the foldable device 100, e.g., a folding state represents a physical form factor of the foldable device 100 for each folding angle in the various ranges of folding angle shown in FIG. 4. One folding state of the foldable device 100 (referred to as a folded state) is defined around a 0-degree folding angle. More particularly, the folded state is defined as a range from a 0 degree folding angle (e.g. as illustrated by foldable device 100b) to a folding angle with a first angle (A1) 401, which may be a pre-set value. In some embodiments, the first angle A1 401 has a value of 30°.

Another folding state of the foldable device 100 (referred to as a tent state) is defined around a 90 degree folding angle. For example, the tent state may include three distinct folding states referred to as a stable tent state, a first unstable tent state (folded side), and a second unstable tent state (unfolded side). More particularly, the first unstable tent state (folded side) is defined as a range from the folding angle with the first angle (A1) 401 to a folding angle with a second angle (A2) 402. The stable tent state is defined as a range from the folding angle with the second angle (A2) 402 to a folding angle with a third angle (A3) 403. The second unstable tent state (unfolded side) is defined as a range from the folding angle with the third angle (A3) 403 to a folding angle with a fourth angle (A4) 404.

A still another folding state of the foldable device 100 (referred to as an unfolded state) is defined near to a 180-degree folding angle. More particularly, the unfolded state is defined as a range from the folding angle with the fourth angle (A4) 404 to a 180 degree folding angle. While it may be considered that when the foldable device is lying flat, the foldable device is not folded, for the purposes of the present application, it will be considered that lying flat corresponds to a folding angle 305 of 180 degrees.

As mentioned above, the foldable device 100 can be folded along the folding edge 103 by a user griping the first and second display segments 301, 303 and moving the back of the flexible display screen 102 towards each other to be in the tent state. As mentioned above a folding state in this disclosure is used to refer a physical configuration of the foldable device 100, e.g., a folding state represents a physical form factor of the foldable device 100 for each folding angle in the various ranges of folding angle shown in FIG. 4. The folding angle 305 of the foldable device 100 when the foldable device 100 is the tent state can be anywhere between the first angle A1 401 and the fourth angle A4 404, as shown in FIG. 4. In some embodiments, the first angle A1 401 can be 30°, and the fourth angle A4 404 can be 150°.

As further elaborated below, the gesture recognition system 206 of the foldable device 100 receives data indicative of the folding angle 305 of the foldable device 100 from the fold detector 208 and determines the folding state of the foldable device 100 based on the folding angle 305 of the foldable device 100. For example, when the folding angle 305 has a value within the pre-defined range between the first angle A1 401 and the fourth angle A4 404, the gesture recognition system 206 determines that the foldable device 100 is in a tent state.

Figure 2C:
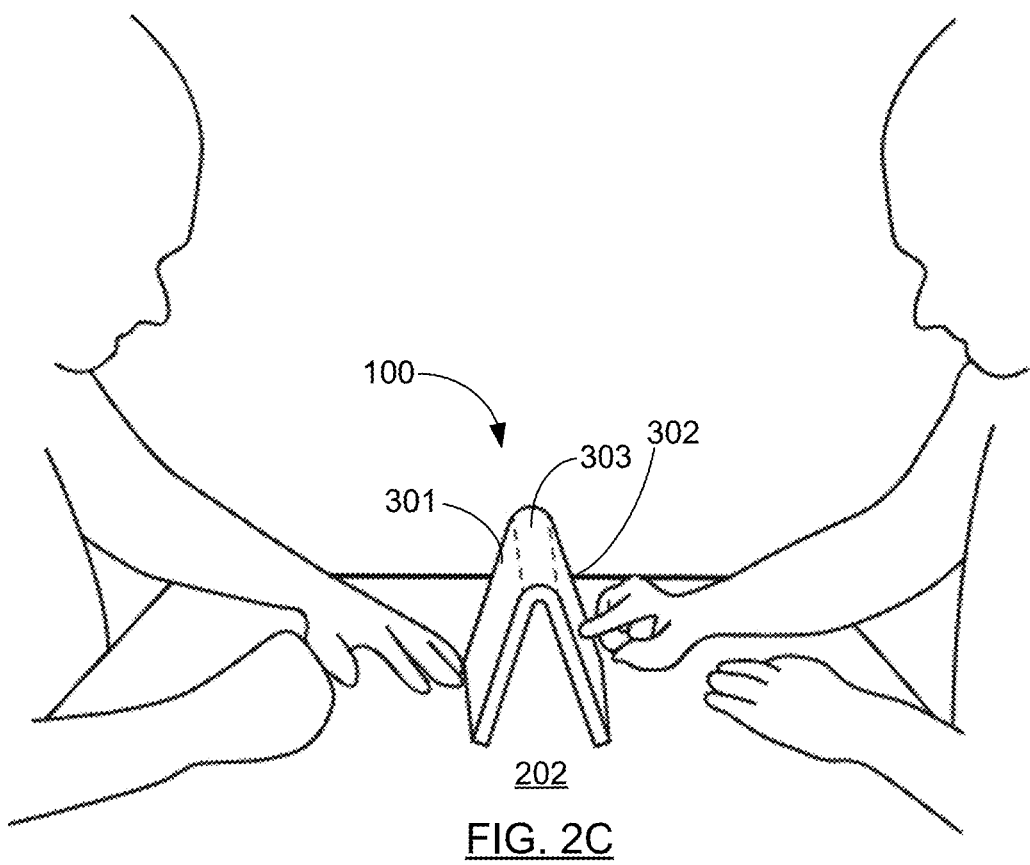
FIG. 2C illustrates a side view of the foldable device of FIG. 1 in a tent state in accordance with aspects of the present application.
Figure 3:
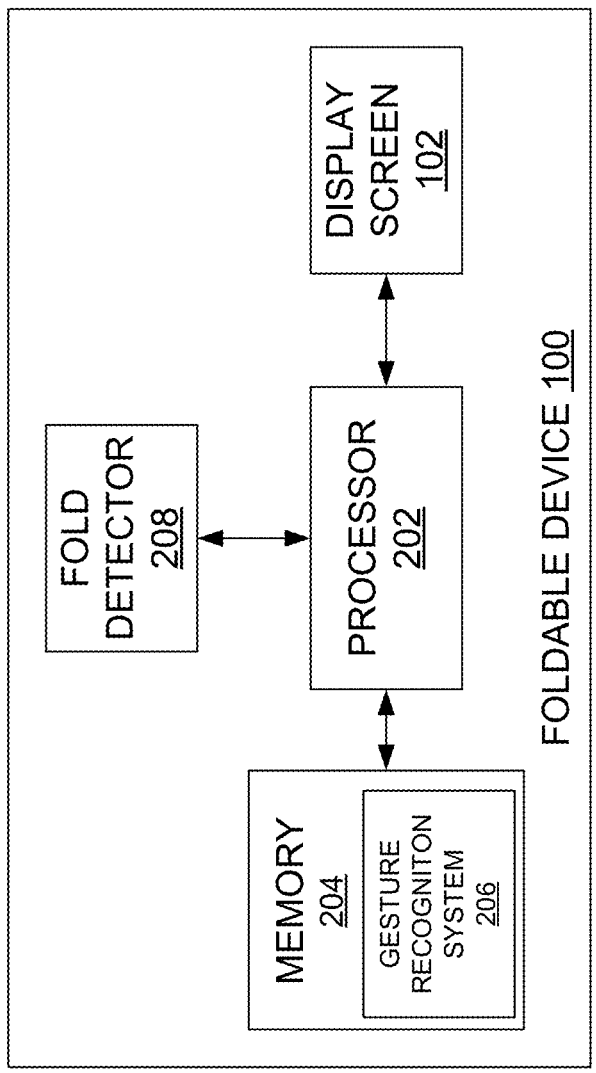
FIG. 3 illustrates a block diagram of the foldable device of FIG. 1.

In the tent state, the foldable device 100 may be placed on a flat surface, such as a table. FIG. 2C shows the foldable device 100 on a flat surface 202. In the tent state, the foldable device 100 is transformed into a self-standing foldable device, enabling users to easily view content on the flexible display screen 102 of the foldable device 100 without holding the foldable device 100 in their hands. As shown in FIG. 2C, when the foldable device 100 is in the tent state, the flexible display screen 102 is partitioned into three display segments: the first display segment 301, the second display segment 302, and the edge display segment 303. Each of the first display segment 301, the second display segment 302, and the edge display segment 303 may be used by one or more users to interact with the foldable device 100. Thus, the foldable device 100 may be seen to support both single-user interactions and multi-user interactions. In other words, the gesture recognition system 206 is configured to detect gestures (e.g. simple input gestures or complex input gestures) performed by a single user or by multiple users.

In the tent state, the foldable device 100 can be used for dual-player game playing, in which each player interacts with one of the first and second display segments 301, 302 of the foldable device 100 independently. The content rendered on each of the first and second display segments 301, 302 may be different for each player. The tent state of the foldable device 100 may be used for collaborative content viewing. In an example of collaborative content viewing, the same content is presented on both the first display segment 301 and on the second display segment 302. The tent state of the foldable device 100 may also be used in a multi-application mode. In multi-application mode, one software application running on the foldable device 102 renders one or more of information, a first GUI, and content on the first display segment 301 and a second independent software application running on the foldable device 102 renders one or more of information, a second GUI and content on the second display segment 302.

Placing the foldable device 100 in the tent state opens up new user interactions capabilities. In conventional, non-foldable devices, user interface (UI) elements (e.g., buttons, icons) of a GUI are rendered on a display on which content is also being rendered. In foldable devices, such as the foldable device 100, the rendering of UI elements on the flexible display screen 102 suffers from three drawbacks when the foldable device 100 is placed in the tent state. In no particular order, a first drawback is that the UI elements may occlude content rendered on the flexible display screen 102, negatively affecting a content viewing experience of a user of the foldable device 100. A second drawback is that, touching a nearly vertical touch-sensitive display surface (e.g., the first display segment 301) for an extended period of time can be ergonomically difficult and may increase user fatigue. A third drawback is that UI elements that are to be simultaneously interacted with by multiple users may need to be rendered on both the first display segment 301 and the second display segment 302. Such duplication may be seen as wasteful of real estate of the flexible display screen 102. In addition, rendering two or more instances of each UI element on multiple display segments 301, 302, 303 can require additional computing power and additional processing time, which causes the battery of the foldable device 100 to drain more quickly.

To avoid occluding content rendered on one or both of the first and second display segments 301, 302, a GUI comprising UI elements for an OS and one or more software applications running on the foldable device 100 may be rendered on an edge display segment 303. Rendering a GUI comprising UI elements on the edge display segment 303 prevents content rendered on one or both of the first and second display segments 301, 302 from being occluded and facilitates user interaction with the content rendered on one or both of the first and second display segments 301, 302.

In addition rendering a GUI comprising UI elements on the edge display segment 303 to enable a user (or multiple users) to interact with the foldable device 100, input gestures that are performed on the edge display 303, in combination with at least one of the first display segment 301 and the second display segment 302 by a user, may be included in a predefined set of available input gestures. However, not all input gestures are suitable when the foldable device 100 is in the tent state. More specifically, certain input gestures may have unintended consequences. For example, when the foldable device 100 is in a particular tent state, such as when the foldable device 100 is in the first unstable tent state where the folding angle 305 has a value between A1 and A2 or in the second unstable tent state where the folding angle 305 has a value between A3 and A4, an input gesture that involves an application of force on the first display segment 301 or the second display segment 302 may cause the foldable device 100 to tip over.

Aspects of the present application relate to limiting input gestures that are available for user interaction with the foldable device 100, depending on the folding state of the foldable device 100. A set of available input gestures for interacting with the foldable device 100 is pre-defined for each folding state of the foldable device (e.g., each pre-defined range of folding angles 305 for the foldable device 100). In some embodiments, the set of available input gestures for each folding state of the foldable device 100 may include a first subset of available input gestures for the first and second segments 301, 302, and a second subset of available input gestures for the edge display segment 303. The set of available input gestures is stored in memory 204 of the foldable device 100. Alternatively, the set of available input gestures may be stored remotely on a server and accessible by the foldable device 100 in real time or near real time.

Referring to FIG. 5, a table of the sets of available input gestures corresponding to five pre-defined ranges of a folding angle 305 is shown. Each pre-defined range of the folding angle 305 corresponds to a folding state of the foldable device 100. Thus, the table includes the set of available input gestures for each folding state of the foldable device 100. In some embodiments, a given input gesture may have different interaction effects depending on which of the first, second, and edge display segments 301, 302, 303 the input gesture was detected on. For example, a tap gesture on the first display segment 301 may be interpreted as a command signal by the OS to open a software application, while the same tap gesture on the edge display segment 303 may be interpreted by the OS as a command signal to show a local date and time. In some embodiments, a given input gesture may have different interaction effects based on the folding state of the foldable device 100. For example, a tap gesture on the first display segment 301 may be interpreted by the OS as a command signal to open software application when the foldable device 100 is in the stable tent state, while the same tap gesture on the first display segment 301 may be interpreted by the OS as a command signal to show a list of recent phone calls when the foldable device 100 is in the unfolded state.

In a first column 501 of the table in FIG. 5, a first subset of available input gestures for the first and second display segments 301, 302 corresponding to each pre-defined range of folding angle (e.g., each folding state of the foldable device 100) are listed, which include, irrespective of the folding angle: tap, hard tap, swipe, pinch/zoom, rotation, cross-segment single swipe, cross-segment double swipe, cross-segment compound swipe, and multi-segment swipe.

In a second column 502 of the table in FIG. 5, a second subset of available input gestures for the edge display segment 303 corresponding to each pre-defined range of folding angle (e.g., each folding state of the foldable device 100) are listed, which include, irrespective of the folding angle: tap, hard tap, swipe, pinch/zoom, rotation, cross-segment single swipe, cross-segment double swipe, cross-segment compound swipe, and multi-segment swipe.

The gesture recognition system 206 can, through the flexible display screen 102 on the foldable device 100, detect and track movement of a user's finger (or a stylus) across one or more of the first, second, and edge display segments 301, 302, 303 of the flexible display screen 102 in order to determine input parameters such as number of touches, direction, force magnitude, velocity, and duration of touches. These input parameters can be used to recognize and determine a type of input gesture. For example, one or more motion sensors on the foldable device 100 can measure acceleration forces and rotational forces along the X-Y-Z axes of the device 100. The motion sensor(s) may include accelerometers, gravity sensors, gyroscopes, or rotational vector sensors.

Through the flexible display screen 102, at any given point in time (e.g. each millisecond or any other suitable time unit), the gesture recognition system 206 tracks and stores at least a timestamp and a location (e.g. pixel position) of each detected input gesture. The gesture recognition system 206 may optionally determine and store a size, and/or a pressure for each detected input gesture. Based on at least the timestamp and location of each detected input gesture over a given period, the gesture recognition system 206 can determine a type of the detected input gesture. For example, if an input gesture is detected for only for one second and centers around the same location on the flexible display screen 102, it is likely a tap gesture. For another example, if a detected input gesture lingers over two seconds and appears to move across a small distance on the flexible display screen 102, it is likely a swipe.

In some embodiments, the foldable device 100 may have one or more pressure sensors integrated into the flexible display screen 102 to measure a force exerted by a user's fingertip (or a stylus) on a surface of the flexible display screen in one of the first, second, and edge display segments 301, 302, 303. The gesture recognition system 206 may, based on a measurement received from the pressure sensor, determine a force exerted by a user's fingertip (or stylus) on the first display segment 301, the second edge display segment 302, or the edge display segment 303, in order to determine if the detected input gesture is a tap gesture or a hard tap gesture.

All the sensors mentioned above can be integrated into the body 105 of the device 100, for example, the sensors may be part of the glass or part of the plastic or metal that overlays on top of the glass of the flexible display screen 102.

One or more environmental sensors on the foldable device 100 can measure various environmental parameters, such as ambient air temperature and pressure, illumination, and humidity. The environmental sensor(s) may include barometers, photometers, or thermometers.

One or more position sensors on the foldable device 100 can measure the physical position of foldable device 100. The position sensor(s) may include orientation sensors or magnetometers.

For example, the gesture recognition system 206 may determine that a user performed a tap gesture by detecting a touch and determining that the force of the touch measured by the pressure sensor is below a predetermined threshold. A hard tap may be detected when the pressure exceeds the predetermined threshold.

The gesture recognition system 206 may determine that a user performed a swipe gesture by detecting a touch that has moved across a surface without losing contact with the flexible display screen 102. A swipe gesture detected on a flat device generally affects the whole screen (e.g. cause the UI rendered on the display screen 102 to change in response to detection of the swipe gesture); however, if a swipe gesture is detected on one of the display segments 301, 302, 303 of the foldable device when the foldable device is in the tent state, a swipe gesture will only affect the display segment on which the swipe gesture was detected on.

The gesture recognition system 206 may determine that a user performed a pinch or zoom gesture by detecting two separate swipe gestures that have occurred simultaneously or concurrently, and dragged toward (pinch gesture) or away (zoom gesture) from each other. When a pinch or zoom gesture is detected when the foldable device 100 is in the unfolded state, the pinch or zoom gesture may cause the GUI rendered on the entire flexible display screen 102 (e.g. all three display segments 301, 302, 303) to change, However, if a pinch or zoom gesture is detected one of three display segments 301, 302, 303 when the foldable device 100 is in tent state, the pinch or zoom gesture will only affect the content rendered on the one on which the gesture detected on.

The gesture recognition system 206 may determine that a user performed a rotation gesture by detecting two touches that have occurred simultaneously, and one is dragged in a circular motion around the other. A rotation gesture on a flat device generally affects the whole screen, however, a rotation done on a segment of a foldable device in tent state, a rotation gesture will only affect the screen on which the gesture is performed on.

In some examples, the foldable device 100 may further include haptic technology to generate a feedback force on a user's finger as the user's finger touches with the first, second, and edge segment 301, 302, 303 of the flexible display screen 102. A feedback force may let the user know that the foldable device 100 has detected the input gesture performed by the user immediately prior to the feedback force.

The operation of the gesture recognition system 206 will now be described. The gesture recognition system 206 receives data indicative of the folding angle 305 from the fold detector 208 and determines a folding state of the foldable device 100 based on the folding angle 305 (i.e., the gesture recognition system 206 determines which range of folding angles the value of the folding angle falls within). The gesture recognition system 206 then detects a gesture on one or more of the first, second and edge display segments 301, 302, 303. The gesture recognition system 206 then determines whether the detected input gesture is a valid input gesture or an invalid input gesture based on the determined folding state of the foldable device 100 as follows.

First, the gesture recognition systems 206 determines whether the detected input gesture is a simple input gesture or a complex input gesture. When the gesture recognition system 206 determines that the detected input gesture is a simple input gesture, the gesture recognition system 206 determines a gesture type that corresponds to the detected simple input gesture (e.g., the gesture recognition system 206 determines whether the detected simple input gesture is a tap gesture, hard tap gesture, a rotation gesture, a pinch gesture, or a zoom gesture). The gesture recognition system 206 then retrieves the set of available input gestures corresponding to the determined folding state of the foldable device 100. As discussed above, the set of available input gestures includes a first subset of available input gestures for the first and second display segments 301, 302 and a second subset of available input gestures for the edge display segment 303. The gesture recognition system 206 then determines which display segment of the first, second, and third display segments 301, 302, 303 the detected simple input gesture was detected on.

When the detected simple input gesture is determined to be detected on one of the first and second display segments 301, 302, the gesture recognition system 206 determines whether the gesture type corresponding to the detected simple input gesture is included in in the first subset of available input gestures corresponding to the determined folding state of the foldable device 100. When the gesture recognition system 206 determines that the gesture type corresponding to the simple input gesture is included in the first subset of available input gestures corresponding to the determined folding state of the foldable device 100, the gesture recognition system 206 determines that detected simple input gesture is a valid input gesture. The gesture recognition system 206 then provides, to a software application or the OS running on the foldable device 100, the gesture type corresponding to the detected simple input gesture (e.g., tap gesture, hard tap gesture, rotation gesture, pinch gesture, or zoom gesture) together with the folding state of the foldable device 100 and display information that includes an identification of which display segment of the first and second display segments 301, 302 the gesture type corresponding to the detected simple input gesture was detected on, and a location of the detected simple input gesture (e.g. the x and y coordinates of the contact point of the detected simple touch gesture on the display segment relative to a defined coordinate system of the flexible display screen 102). The software application or the OS running on the foldable device 100 receives the gesture type corresponding to detected simple input gesture together with the folding state of the foldable device 100 and the display information, and determines an action to be performed based on the gesture type, the folding state of the foldable device 100 and the display information. The software application or the OS then performs the determined action. Examples of actions performed by a software application or the OS are shown in FIGS. 6, 7, 8, 9 and 18.

When the simple input gesture is determined to be detected on the edge display segment 303, the gesture recognition system 206 determines whether the gesture type corresponding to the simple input gesture is included in the second subset of available input gestures corresponding to the determined folding state of the foldable device 100. When the gesture recognition system 206 determines that the gesture type corresponding to the detect simple input gesture is included in the second subset of available input gestures corresponding to the determined folding state of the foldable device 100, the gesture recognition system 206 determines that the detected simple input gesture is a valid input gesture, and the gesture recognition system 206 provides, to a software application or the OS running on the of the foldable device 100, the gesture type corresponding to the detected simple input gesture together with the folding state of the foldable device 100 and display information that includes an indication that the simple input gesture was detected on the edge display segment 303, and a location of the simple input gesture (e.g. the x and y coordinates of the contact point of the simple touch gesture on the edge display segment 303 relative to a defined coordinate system of the flexible display screen 102). The software application or the OS running on the foldable device 100 receives the gesture type corresponding to the detected simple input gesture together with the folding state and the display information, and determines an action to be performed based on the gesture type, the folding state the foldable device 100, and the display information. The software application or the OS then performs the determined action. Examples of actions performed by a software application or the OS are shown in FIGS. 6, 7, 8, 9 and 18.

When the simple input gesture was determined to be detected on one of the first and second display segments 301, 302 and the gesture recognition system 206 determine that the gesture type corresponding to the simple input gesture in not included in the first subset of available input gestures corresponding to the determined folding state of the foldable device 100, the gesture recognition system 206 determines that the detected input gesture is an invalid input gesture (i.e., not a valid input gesture). The gesture recognition system 206 ignores the detected simple input gesture when the detected simple input gesture is determined to be an invalid input gesture.

When the gesture recognition system 206 determines that the detected input gesture was a complex input gesture, the gesture recognition system 206 determines a gesture type that corresponds to the detected complex input gesture (e.g., the gesture recognition system 206 determines whether the detected complex input gesture is a cross-segment single swipe gesture, across-segment double swipe gesture, a cross segment compound swipe gesture, a multi-segment multi-swipe gesture). The gesture recognition system 206 then retrieves the set of available input gestures corresponding to the determined folding state of the foldable device 100. The gesture recognition system 206 then determines whether the detected complex input gesture corresponding to the complex input gesture is included in the set of available input gestures corresponding to the determined folding state of the foldable device 100. When the gesture recognition system 206 determines that the gesture type corresponding to the complex input gesture is included in the set of available input gestures corresponding to the determined folding state of the foldable device 100, the gesture recognition system 206 determines that detected complex input gesture is a valid input gesture, and provides, to a software application or the OS running on the of the foldable device 100, the gesture type corresponding to the detected complex input gesture together with the folding state of the foldable device 100 and display information that includes information on which display segments the complex input gesture was detected on. The software application or the OS running on the foldable device 100 receives the gesture type corresponding to detected complex input gesture together with the folding state of the foldable device 100 and the display information, and determines an action to be performed based on the gesture type corresponding to detected complex input gesture, the folding state of the foldable device 100 and the display information. The software application or the OS then performs the determined action. Examples of actions performed by a software application or the OS are shown in FIGS. 11, 13, 15, and 17.

The gesture recognition system 206 determines that the complex gesture is an invalid input gesture when the gesture type corresponding to the detected complex input gesture is not included in the set of available input gestures corresponding to the folding angle 305 of the foldable device 100. The gesture recognition system 206 ignores the detected complex input gesture when the gesture type corresponding to the detected complex gesture is determined to be an invalid input gesture.

FIG. 6 shows a table 600 for a tap gesture for each of five pre-defined ranges of a folding angle 305 shown in FIG. 4. Table 600 includes a row corresponding to each of five pre-defined ranges of a folding angle 305 (i.e., five states of the folding device) shown in FIG. 4. Table 600 shows, for each of the five pre-defined ranges of a folding angle 305, whether a tap gesture is a valid gesture (denoted by YES) or invalid (denoted by NO) when the tap gesture is detected on one the first and second display segments 301, 302 (as shown in the column with the heading "MAIN SEGMENTS (301, 302))" or when tap gesture is detected on edge display segment 303 (as shown in the column with the heading "EDGE (303))". Table 600 also shows, for each of the five pre-defined ranges of a folding angle 305, an action performed by a software application or OS running on the foldable device 100 when the tap gesture is a valid input gesture and detected on one of the first and second display segments 301, 302 (as shown in the column with the heading "USE CASE EXMAPLE" adjacent to the column with the heading "MAIN SEGMENTS (301, 302)") or an action performed by a software application or OS running on the foldable device 100 when the tap gesture is a valid input gesture and detected on the edge display segment 303 (as shown in the column with the heading "USE CASE EXMAPLE" adjacent to the column with the heading "EDGE (303))".

As shown in Table 600, a tap gesture is a valid input gesture when the folding angle 305 has a value between 0° and A1 (e.g., when the foldable device 100 is in the folded state) and the tap gesture is detected on the edge display segment 303. In this case, the action performed by the OS running on the foldable device 100 includes rendering the UI elements for the most recently opens software applications on the edge display segmented 303 of the foldable device 100.

A tap gesture is shown in Table 600 to be a valid input gesture when the folding angle 305 has a value between A1 and A2 (when A2≤90°) (e.g., when the foldable device 100 is in the folded state) and the tap gesture is detected on the edge display segment 303. In this case, the action performed by the OS running on the foldable device 100 includes rendering the UI elements for the most recently opens software applications on the edge display segmented 303 of the foldable device 100.

A tap gesture is also shown in Table 600 to be a valid input gesture when the folding angle 305 has a value between A2 and A3 (when A3≥90°) (e.g., when the foldable device 100 is in the stable tent state) and the tap is detected on one of the first display segment 301 and the second display segment 302. In this case, a software application or OS running on the foldable device 100 determines whether the tap gesture was on a UI element that is a "back button" is rendered on the one of the first and second display segments based on the display information for the tap gesture received from the gesture recognition system 206. If the software application or OS determines the tap gesture was on the "back button", the software application or OS performs an action associated with the "back button". The action associated with the "back button" includes rendering information previously displayed by the software application or the OS on the one of the first and second display segments 301, 302.

A tap gesture is also shown in Table 600 to be a valid input gesture when the folding angle 305 has a value between A2 and A3 (when A3≥90°) (e.g. when the foldable device 100 is in the stable tent state) and the tap is detected on the edge display segment 303. In this case, the OS running on the foldable device 100 determines whether the tap gesture was on a UI element rendered on the edge display segment 303 based on the display information for the tap gesture received from the gesture recognition system 206. If the OS determines that the tap gesture was on a UI element rendered the edge display segment 303, the OS performs an action associated with the UI element rendered on the edge display segment 303 on which the tap gesture was detected on. The action includes, for example, highlighting the UI element as being selected.

A tap gesture is also shown in Table 600 to be a valid input gesture when the folding angle 305 has a value between A4 and 180° (e.g., when the foldable device 100 is in the unfolded state) and the tap is detected on the one of the first and second display segments 301, 302. In this case, the OS running on the foldable device 100 performs an action associated with a UI element rendered on the one of the first and second display segments 301, 302. The action includes opening a software application associated with UI element rendered on the one of the first and second display segments 301, 302.

A tap gesture is also shown in Table 600 to be a valid input gesture when the folding angle 305 has a value between A4 and 180° (e.g., when the foldable device 100 is in the unfolded state) and the tap is detected on the edge display segment 303. In this case, the OS running on the foldable device performs an action associated with a UI element rendered on the display segment. The action includes opening a software application associated with UI element rendered on the edge display segment 303.

FIG. 7 shows a table 700 for a hard tap gesture for each of five pre-defined ranges of a folding angle 305 shown in FIG. 4. Table 700 includes a row corresponding to each of five pre-defined ranges of a folding angle 305 (i.e., five states of the folding device) shown in FIG. 4. Table 700 shows, for each of the five pre-defined ranges of a folding angle 305, whether a hard tap gesture is a valid gesture (denoted by YES) or invalid (denoted by NO) when the hard tap gesture is detected on one the first and second display segments 301, 302 (as shown in the column with the heading "MAIN SEGMENTS (301, 302))" or when hard tap gesture is detected on edge display segment 303 (as shown in the column with the heading "EDGE (303))". Table 700 also shows, for each of the five pre-defined ranges of a folding angle 305, an action performed by a software application or OS running on the foldable device 100 when the hard tap gesture is a valid input gesture and detected on one of the first and second display segments 301, 302 (as shown in the column with the heading "USE CASE EXMAPLE" adjacent to the column with the heading "MAIN SEGMENTS (301, 302)") or an action performed by a software application or OS running on the foldable device 100 when the hard tap gesture is a valid input gesture and detected on the edge display segment 303 (as shown in the column with the heading "USE CASE EXMAPLE" adjacent to the column with the heading "EDGE (303))".

As shown in Table 700, a hard tap gesture is an invalid gesture when the folding angle 305 has a value between 0° and A1 (e.g., when the foldable device 100 is in the folded state) when the hard tap gesture is detected on any one of the display segments 301, 302, 303.

A hard tap gesture is shown in Table 700 to be a valid input gesture when the folding angle 305 is between A1 and A2 (when A2≤90°) (e.g., when the foldable device 100 is in the first unstable tent state) and the hard tap gesture is detected on the edge display segment 303. In this case, the OS running on the foldable device 100 confirms that an action associated with a previously detected gesture should be performed, and performs the action.

A hard tap gesture is shown in Table 700 to be a valid input gesture when the folding angle 305 is between A2 and A3 (when A3≥90°) (e.g., when the foldable device 100 is in the stable tent state) and the hard tap gesture is detected on one of the first and second display segments 301, 302. In this case, the action performed by the OS running on the foldable device 100 includes providing haptic feedback to a user of the foldable device 100.

A hard tap gesture is also shown in Table 700 to be a valid input gesture when the folding angle 305 is between A2 and A3 (when A3≥90°) (e.g., when the foldable device 100 is in the stable tent state) and when the hard tap gesture is detected on the edge display segment 303. In this case, the action performed by the OS running on the foldable device 100 includes closing a recently opened software application if the hard tap gesture is detected on UI element associated with the recently opened software application rendered on the edge display segment 303.

A hard tap gesture is also shown in Table 700 to be a valid input gesture when the folding angle 305 has a value between A3 and A4 (e.g., the foldable device 100 is in the unfolded states) and the hard tap gesture is detected on one the first and second display segments 301, 302. In this case, the action performed by the OS running on the foldable device 100 includes providing haptic feedback to a user of the foldable device 100.

A hard tap gesture is also shown in Table 700 to be a valid input gesture when the folding angle 305 has a value between A4 and 180° (e.g., the foldable device 100 is in the unfolded states) and the hard tap gesture is detected on one the first and second display segments 301, 302. In this case, the action performed by the OS running on the foldable device 100 includes providing haptic feedback to a user of the foldable device 100.

A hard tap gesture is a valid input gesture when the folding angle 305 has a value between A4 and 180° and is the hard tap gesture is detected on the edge display segment 303. In this case, the OS will perform an action associated with the hard tap, such as for example confirming that an action associated with a previously detected input gesture should be executed, or closing a recently opened application if the hard tap gesture is detected on a UI element associated with a recently opened application rendered on the edge display segment 303.

FIG. 8 shows a table 800 for a swipe gesture for each of five pre-defined ranges of a folding angle 305 shown in FIG. 4. Table 800 includes a row corresponding to each of five pre-defined ranges of a folding angle 305 (i.e., five states of the folding device) shown in FIG. 4. Table 800 shows, for each of the five pre-defined ranges of a folding angle 305, whether a swipe gesture is a valid gesture (denoted by YES) or invalid (denoted by NO) when the swipe gesture is detected on one the first and second display segments 301, 302 (as shown in the column with the heading "MAIN SEGMENTS (301, 302))" or when swipe gesture is detected on edge display segment 303 (as shown in the column with the heading "EDGE (303))". Table 800 also shows, for each of the five pre-defined ranges of a folding angle 305, an action performed by a software application or OS running on the foldable device 100 when the swipe gesture is a valid input gesture and detected on one of the first and second display segments 301, 302 (as shown in the column with the heading "USE CASE EXMAPLE" adjacent to the column with the heading "MAIN SEGMENTS (301, 302)") or an action performed by a software application or OS running on the foldable device 100 when the swipe gesture is a valid input gesture and detected on the edge display segment 303 (as shown in the column with the heading "USE CASE EXMAPLE" adjacent to the column with the heading "EDGE (303))".

A swipe gesture is shown in Table 800 to be an invalid input gesture when the folding angle 305 has a value between 0° and A1 (e.g., when the foldable device 100 is in the folded state) and the swipe gesture is detected wholly on one of the first and second display segments 301, 302.

A swipe gesture is shown in Table 800 to be a valid input gesture when the folding angle 305 has a value between 0° and A1 (e.g., when the foldable device 100 is in the folded state) and the swipe gesture is detected on the edge display segment 303. In this case, the OS running on the foldable device performs an action associated with the swipe gesture, such as accept or reject an incoming call.

A swipe gesture is also shown in Table 800 to be a valid input gesture when the folding angle 305 is between A1 and A2 (when A2<90°) (e.g., when the foldable device 100 is in the first stable tent state) and when the swipe gesture is detected on the edge display segment 303. In this case, a software application running on the foldable device 100 (e.g., a music playing application) performs an action associated with the swipe gesture (e.g., play the previous or next previous song).

A swipe gesture is also shown in Table 800 to be a valid input gesture when the folding angle 305 is between A2 and A3 (when A3≥90°) (e.g., when the foldable device 100 is in the stable tent state) and the swipe gesture is detected on one of the first and second display segments 301, 302. In this case, a software application running on the foldable device 100 (e.g., a music playing application) performs an action associated with the swipe gesture for the one of the first and second display segments 301, 302 the swipe gesture was detected on (e.g., play the previous or next previous song).

A swipe gesture is also shown in Table 800 to be an invalid input gesture when the folding angle 305 has a value between A3 and A4 (e.g., when the foldable device 100 is in the second unstable tent state).

A swipe gesture is shown in Table 800 to be a valid input gesture when the folding angle 305 has a value between A4 and 180° (e.g., the foldable device is in the unfolded state) and the swipe gesture is detected on one of the first and second display segments 301, 302. In this case, a software application (e.g. a photo application) running on the foldable device 100 performs and action associated with the swipe gesture for the one of the first and second display segments 301, 302 the swipe gesture was detected on (e.g., display next photo(s) or previous photo(s)).

A swipe gesture is also shown in Table 800 to be a valid gesture when the folding angle 305 has a value between A4 and 180° (e.g., the foldable device is in the unfolded state) and the swipe gesture is detected on the edge display segment 303. In this case, a software application running on the foldable device 100 (e.g. a video player application playing a video) performs and action associated with the swipe gesture for the edge display segment 303 (e.g., go back or forth in the video).

FIG. 9 shows a table 900 for a pinch/zoom gesture for each of five pre-defined ranges of a folding angle 305 shown in FIG. 4. Table 900 includes a row corresponding to each of five pre-defined ranges of a folding angle 305 (i.e., five states of the folding device) shown in FIG. 4. Table 900 shows, for each of the five pre-defined ranges of a folding angle 305, whether a pinch/zoom gesture is a valid gesture (denoted by YES) or invalid (denoted by NO) when the pinch/zoom gesture is detected on one the first and second display segments 301, 302 (as shown in the column with the heading "MAIN SEGMENTS (301, 302))" or when pinch/zoom gesture is detected on edge display segment 303 (as shown in the column with the heading "EDGE (303))". Table 900 also shows, for each of the five pre-defined ranges of a folding angle 305, an action performed by a software application or OS running on the foldable device 100 when the pinch/zoom gesture is a valid input gesture and detected on one of the first and second display segments 301, 302 (as shown in the column with the heading "USE CASE EXMAPLE" adjacent to the column with the heading "MAIN SEGMENTS (301, 302)") or an action performed by a software application or OS running on the foldable device 100 when the pinch/zoom gesture is a valid input gesture and detected on the edge display segment 303 (as shown in the column with the heading "USE CASE EXMAPLE" adjacent to the column with the heading "EDGE (303))".

A pinch or zoom gesture is shown in Table 900 to be an invalid input gesture when the folding angle 305 has a value between 0° and A1 (e.g. when the foldable device 100 is in the folded state) and the pinch/zoom gesture is detected on one of the first display segment 301 and the second display segment 302.

A pinch/zoom gesture is shown in Table 900 to be a valid input gesture when the folding angle 305 has a value between 0° and A1 (e.g. when the foldable device 100 is in the folded state) and the pinch/zoom gesture is detected the edge display segment 303. In this case, the OS running on the foldable device 100 performs an action associated with the pinch/zoom gesture for the edge display segment 303 that includes locking a UI rendered on the edge display segment 303.

A pinch/zoom gesture is shown in Table 900 to be a valid input gesture when the folding angle 305 is between A1 and A2 (when A2<90°) (e.g., the foldable device 100 is in the first unstable tent state) and the pinch/zoom gesture is detected on the edge display segment 303. In this case, a software application running on the foldable device 100 (e.g., a music application) performs an action associated with the pinch/zoom gesture for the edge display segment 303 (e.g., play a next song or a previous song).

A pinch/zoom gesture is shown in Table 900 to be a valid input gesture when the folding angle 305 is between A2 and A3 (when A3≥90°) (e.g. when the foldable device 100 is in the stable tent state) and the pinch/zoom gesture is detected sensed on one of the first and second display segments 301, 302. In this case, software application running on the foldable device 100 (e.g., a photo application) performs an action associated with the pinch/zoom gesture for the one of the first and second display segments 301, 302 the pinch/zoom was detected on (e.g., display next photo(s) or a previous photo(s)).

A pinch/zoom gesture is shown in Table 900 to be a valid input gesture when the folding angle 305 is between A2 and A3 (when A3≥90°) (e.g. when the foldable device 100 is in the stable tent state) and the pinch/zoom gesture is detected on the edge display segment 303. In this case, a software application running on the foldable device 100 (e.g., a music application) performs an action associated with the pinch/zoom gesture for the edge display segment 303 (e.g., play a next song or a previous song).

A pinch or zoom gesture is shown in Table 900 to be an invalid input gesture when the folding angle 305 has a value between A3 and A4 (e.g., when the foldable device 100 is in the second unstable tent state).

A pinch or zoom gesture is shown in Table 900 to be a valid input gesture when the folding angle 305 has a value between A4 and 180° (e.g. when the foldable device 100 is in an unfolded state) and the pinch/zoom gesture is detected on one of the first and second display segments 301, 302. In this case, a software application running on the foldable device 100 (e.g., a photo application) performs an action associated with the pinch/zoom gesture for the one of the first and second display segments 301, 302 the pinch/zoom gesture is detected on (e.g., to zoom into a photo rendered on one of the first and second display segments 301, 302).

A pinch or zoom gesture is shown in Table 900 to be a valid input gesture when the folding angle 305 has a value between A4 and 180° (e.g. when the foldable device 100 is in an unfolded state) and the pinch/zoom gesture is detected on the edge display segment 303. In this case, a software application running on the foldable device 100 performs an action associated with the pinch or zoom gesture for the edge display segment 303 (e.g., rendering more UI elements on the edge display segment).

Figure 10C:
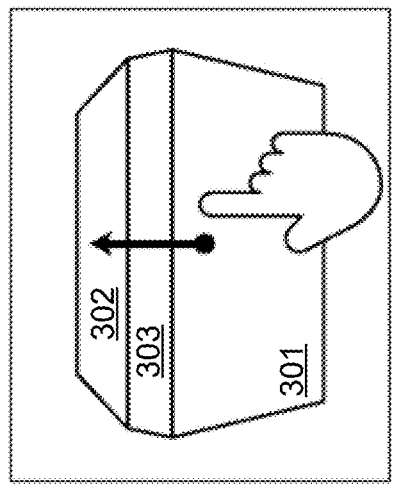
FIG. 10A-10C illustrate top views of the foldable device of FIG. 1 in which various implementations of a cross-segment single swipe gesture are shown in accordance with aspects of the present application.
Figure 10B:
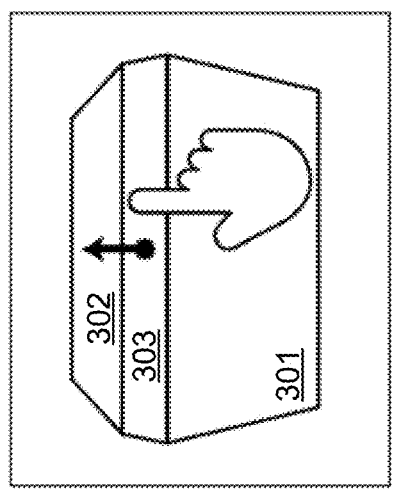
Figure 10A:
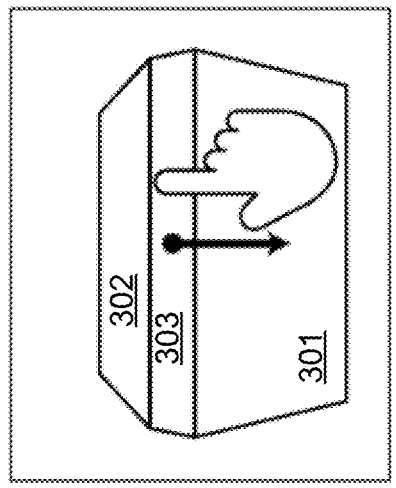

FIGS. 10A, 10B, 10C show three top views 1002, 1004, 1006 of the foldable device 100 in which various implementations of a cross-segment swipe gesture are shown. In the present disclosure, a cross-segment swipe gesture is a gesture that is first detected in one of the first, second, and edge segments 301, 302, 303 and subsequently within the same gesture (i.e., the touch input is still continuously detected) the gesture is detected in a different one of the display segments 301, 302, 303. A cross-segment swipe gesture may be cross-segment single swipe gesture (i.e., a cross-segment gesture that is only detected on one of the first, second, and edge segments 301, 302, 303 at any time during the gesture), or may be a cross-segment complex swipe gesture (i.e., a cross-segment swipe gesture that is detected one two or more first, second, and third display segments 301, 302, 303 for at least a portion of the time during the gesture). FIG. 10A shows a cross-segment single swipe starts with a single touch on the edge display segment 303 and the single touch moves to the first display segment 301. FIG. 10B shows another cross-segment single swipe gesture that starts with a single touch on the edge display segment 303 and the single touch moves to the second display segment 302. FIG. 10C shows still another cross-segment single swipe gesture that starts with a touch on the first display segment 301 and the single touch moves to the second display segment 302, via the edge display segment 303.

FIG. 11 shows a table 1100 for a cross-segment single swipe gesture for each of five pre-defined ranges of a folding angle 305 shown in FIG. 4. Table 1100 includes a row corresponding to each of five pre-defined ranges of a folding angle 305 (i.e., five states of the folding device) shown in FIG. 4. Table 1100 shows, for each of the five pre-defined ranges of a folding angle 305, whether a cross-segment single swipe gesture is a valid gesture (denoted by YES) or invalid (denoted by NO). Table 1100 includes a column (denoted by the heading "EXAMPLE USE CASES") that shows an example action perform by a software application or the OS running on the foldable device 100 for each of five pre-defined ranges of a folding angle 305.

As shown in Table 1100, a cross-segment single swipe gesture is an invalid gesture when the folding angle 305 has a value between 0° and A1 (e.g., when the foldable device is in the folded state) and when the folding angle has a value between A1 and A2 (where A2≥90°) (e.g., when the foldable device is in the first unstable tent state.

A cross-segment single swipe gesture is a valid input gesture when the folding angle 305 has a value between A2 and A3 (when A3≥90°) (e.g., when the foldable device is in the stable tent state). When the gesture recognition system 206 determines that the cross-segment is a valid input gesture, the gesture recognition system 206 provides the cross-segment single swipe gesture and state information indicating that the foldable device 100 is in to a software application or the OS running on the foldable device, which performs an action associated with the cross-segment single swipe gesture when the foldable device is in. For example, as shown in Table 1100, the OS dismisses a notification shown on the edge display segment 303 when the OS receives the cross-segment single swipe gesture and the state information indicative that the foldable device 100 is in the stable tent state.

As shown in Table 1100, a cross-segment single swipe gesture is an invalid gesture when the folding angle 305 has a value between A3 and A4 (i.e., when the gesture recognition system 206 determines that foldable device 100 is in the second unstable tent state).

As shown in Table 1100, a cross-segment single swipe action gesture is a valid input gesture when the folding angle 305 has a value between A4 and 180° (i.e., when the gesture recognition system 206 determines that foldable device 100 is in the second unstable tent state). When the gesture recognition system 206 determines that the cross-segment is a valid input gesture, the gesture recognition system 206 provides the cross-segment single swipe gesture and the state information indicating that the foldable device 100 is in the second unstable tent state to a software application or the OS running on the foldable device. For example, as shown in Table 1100, a software application running on the foldable device 1100 performs the same action that is associated with a swipe gesture as described above in connection with FIG. 8.

Figure 12:
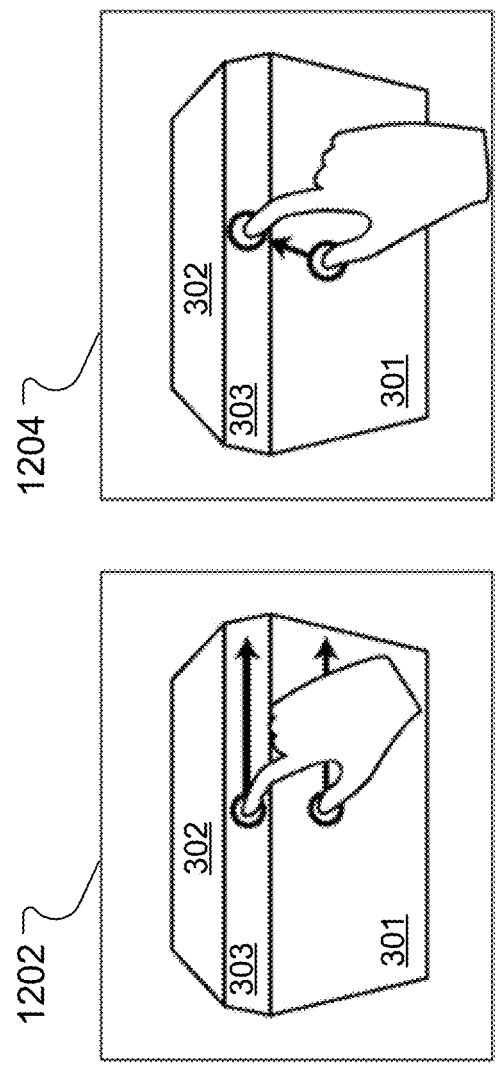
FIG. 12 illustrates various implementations of a cross-segment double swipe gesture in accordance with aspects of the present application.

Referring to FIG. 12A and FIG. 12B, two different cross-segment double swipe gestures in accordance with aspects of the present application are shown. In FIG. 12A, a first cross-segment double swipe gesture is shown which includes two simultaneous swipe gestures with the first swipe gesture of the two simultaneous swipe gestures starting and ending on first display segment 301 and the second swipe gesture of the two simultaneous swipe gestures starting and ending on the edge display segment 303. In FIG. 12B, a second cross-segment double swipe gesture is shown which includes two simultaneous swipe gestures with the first swipe gesture of the two simultaneous swipe gestures starting on the first display segment 301 and ending on the edge display segment 303, and the second swipe gesture of the two simultaneous swipe gestures starting on the edge display segment 303 and ending within the edge display segment 303.

FIG. 13 shows a table 1300 for a cross-segment single swipe gesture for each of five pre-defined ranges of a folding angle 305 shown in FIG. 4. Table 1300 includes a row corresponding to each of five pre-defined ranges of a folding angle 305 (i.e., five states of the folding device) shown in FIG. 4. Table 1300 shows, for each of the five pre-defined ranges of a folding angle 305, whether a cross-segment single swipe gesture is a valid gesture (denoted by YES) or invalid (denoted by NO). Table 1300 also includes a column (denoted by the heading "EXAMPLE USE CASES") that shows an example action perform by a software application or the OS running on the foldable device 100 for each of five pre-defined ranges of a folding angle 305.

As shown in Table 1300, a cross-segment double swipe gesture is a valid input gesture when the folding angle 305 has a value between 0° and A1 (e.g. when the foldable device 100 is in the folded state), in which case the gesture recognition system 206 provides the cross-segment double swipe gesture and state information indicative that the state of the foldable device 100 to a software application or the OS running on the foldable device to perform an action associated with the cross-segment double swipe gesture for the folded state. For example, the software application may activate a fast swipe action when the cross-segment double swipe gesture has one finger (or contact point) held steady on the edge display segment 303 while the other finger (or contact point) swipes across a surface of the first 301 or second 302 main display segment.

Table 1300 shows that a cross-segment double swipe gesture is an invalid input gesture when the folding angle 305 has a value between A1 and A2 (when A2<90°) (e.g. when the foldable device 100 is in the first unstable tent state) or between A3 and A4 (e.g. when the foldable device 100 is in the second unstable tent state). Table 1300 also shows that a cross-segment double swipe gesture is a valid input gesture when the folding angle 305 has a value between A2 and A3 (when A3≥90°) (e.g. when the foldable device 100 is in the stable tent state), in which case the gesture recognition system 206 provides the cross-segment double swipe gesture and state information indicative that the state of the foldable device 100 (e.g., stable tent state) to a software application or OS running on the foldable device 100 which performs an action associated with cross-segment double swipe gesture for the stable tent state. For example, the software application bookmarks a website onto the edge display segment 303 when the cross-segment double swipe gesture has one finger (or contact point) held steady on the edge display segment 303 while the other finger (or contact point) swipes up a surface of the first 301 or the second 302 main display segment.

Table 1300 further shows that a cross-segment double swipe gesture is a valid input gesture when the folding angle 305 has a value between A4 and 180° (e.g. when the foldable device 100 is in unfolded state), in which case the gesture recognition system 206 provides the cross-segment double swipe gesture and state information indicative that the state of the foldable device 100 (e.g., unfolded state) to a software application or OS running on the foldable device 100 which performs an action associated with the cross-segment double swipe gesture for the unfolded state. For example, the software application or OS running on the foldable device 100 which performs an action similar to an action associated with a "hold and drag" gesture of a conventional gesture set (i.e., to move a UI element rendered on the flexible screen 102).

Figure 14:
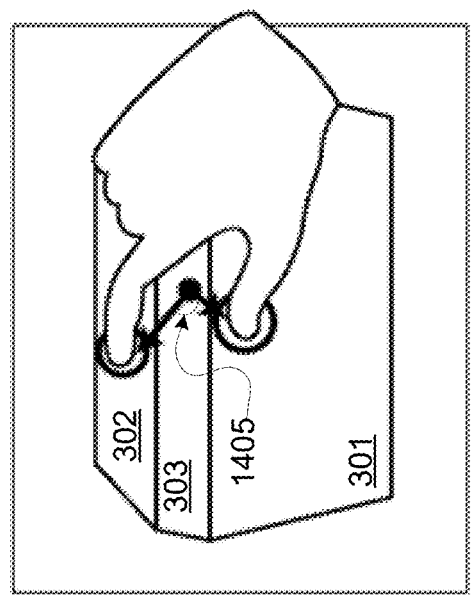
FIG. 14 illustrates an example implementation of a cross-segment compound swipe gesture in accordance with aspects of the present application.

FIG. 14 illustrates an example implementation of a cross-segment compound swipe gesture 1402 in accordance with aspects of the present application. In the present disclosure, a cross-segment compound gesture is a sub-type of a cross-segment complex gesture that is first detected on one of the three display segments 301, 302, 303 and subsequently within the same gesture (i.e., the touch input is still continuously detected), the gesture is detected in two other different displays segments 301, 302, 303. In the illustrated implementation, a first of two simultaneous swipes starts on a contact point on the edge display segment 303 and ends on the first display segment, while the second of the two swipes starts on the same contact point on the edge display segment 303 and ends on the second display segment 302. An interior angle 1405 is an angle formed between the two simultaneous swipes.

FIG. 15 illustrates a table 1500 for a cross-segment compound swipe gesture for each of five pre-defined ranges of a folding angle 305 shown in FIG. 4. Table 1500 includes a row corresponding to each of five pre-defined ranges of a folding angle 305 (i.e., five states of the folding device) shown in FIG. 4. Table 1500 shows, for each of the five pre-defined ranges of a folding angle 305, whether a cross-segment single swipe gesture is a valid gesture (denoted by YES) or invalid (denoted by NO). Table 1500 also a column (denoted by the heading "EXAMPLE USE CASES") that shows an example action perform by a software application or the OS running on the foldable device 100 for each of five pre-defined ranges of a folding angle 305.

As shown in Table 1500, a cross-segment compound swipe gesture is a valid input gesture when the folding angle 305 has a value between 0° and A1 (i.e., the foldable device 100 is in the folded state), in which case a software application or the OS running on the foldable device 100 performs an action associated with the cross-segment swipe gesture. In Table 1500, the action performed by the software application of OS includes rendering UI elements for sharing options on the first display segment 301.

Table 1500 also shows that a cross-segment compound swipe gesture is an invalid input gesture when the folding angle 305 has a value between A1 and A2 (when A2<90°) (i.e. when the foldable device 100 is in the first unstable tent state) or a value between A3 and A4 (i.e., when the foldable device 100 is in the second unstable tent state).

Table 1500 also shows that a cross-segment compound swipe gesture is valid gesture when the folding angle 305 has a value between A2 and A3 (when A3≥90°), in which case a software application or the OS running on the foldable device 100 performs an action associated with the cross-segment compound swipe gesture that includes merging information displayed on the first and second display segments 301, 302.

Table 1500 also shows that a cross-segment compound swipe gesture is a valid input gesture when the folding angle 305 has a value between A4 and 180° (i.e. the foldable device 100 is determined to be in the unfolded state). In this case, a software application running on the foldable device 100 performs an action associated with the cross-segment compound swipe gesture. In this embodiment, the action associated with the cross-segment compound swipe gesture may be the same action that is associated with a conventional pinch gesture (e.g. zoom in on content rendered on the entire flexible display screen 102).

Figure 16:
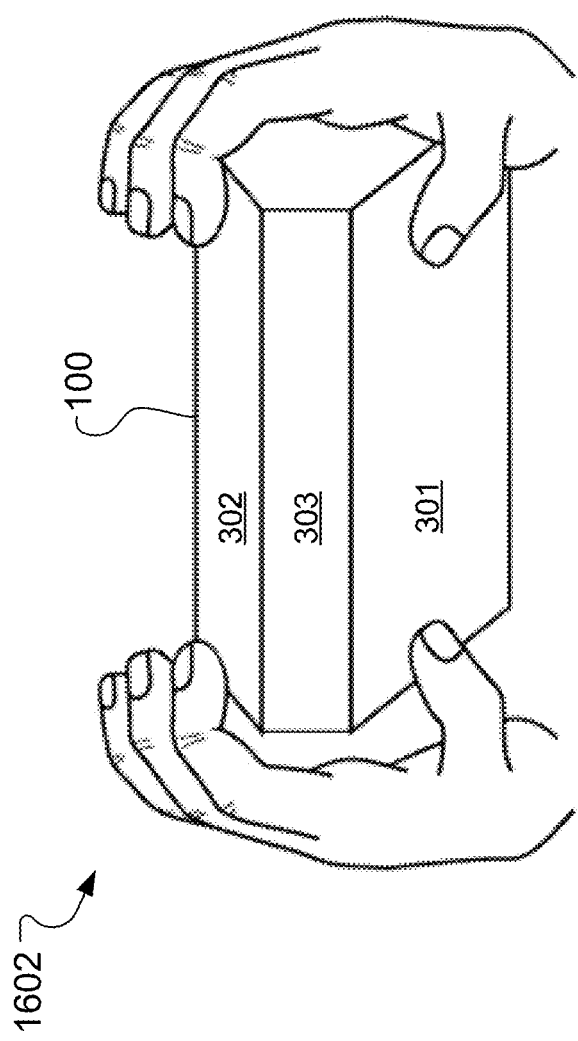
FIG. 16 illustrates an example implementation of a multi-segment swipe gesture in accordance with aspects of the present application.

FIG. 16 illustrates an example implementation 1602 of a multi-segment multi-swipe gesture in accordance with aspects of the present application. As illustrated in the example implementation 1602, two swipes may be concurrently carried out on both the first segment 301 and the second segment 302.

FIG. 17 illustrates a table 1700 for a multi-segment multi-swipe gesture for each of five pre-defined ranges of a folding angle 305 shown in FIG. 4. Table 1700 includes a row corresponding to each of five pre-defined ranges of a folding angle 305 (i.e., five states of the folding device) shown in FIG. 4. Table 1700 shows, for each of the five pre-defined ranges of a folding angle 305, whether a multi-segment multi-swipe gesture is a valid gesture (denoted by YES) or invalid (denoted by NO). Table 1500 also a column (denoted by the heading "EXAMPLE USE CASES") that shows an example action perform by a software application or the OS running on the foldable device 100 for each of five pre-defined ranges of a folding angle 305.

As shown in Table 1700, a multi-segment multi-swipe gesture is a valid input gesture when the folding angle 305 has a value between 0° and A1° (i.e., when the foldable device 100 is in the folded state), in which case a software application or the OS running on the foldable device 100 performs an action associated with the multi-segment multi-swipe gesture that includes a fast scroll of content rendered both the first and second display screens 301, 302.

Table 1700 also shows that a multi-segment multi-swipe gesture is a valid input gesture when the folding angle 305 has a value between A1 and A2 (<90°) (i.e., when the foldable device 100 is in the first unstable state), in which case a software application or the OS running on the foldable device 100 performs an action associated with the multi-segment multi-swipe gesture that includes a fast scroll of content rendered both the first and second display screens 301, 302.

Table 1700 also shows a multi-segment multi-swipe gesture is a valid input gesture when the folding angle 305 has a value between A2 and A3 (when A3≥90°) (i.e., when the foldable device 100 is in the stable tent state), in which case a software application or the OS running on the foldable devices performs an action associated with the multi-segment swipe gesture that includes a fast scroll or large zoom of content rendered on both the first and second display segments 301, 302.

Table 1700 also shows that a multi-segment multi-swipe gesture is an invalid input gesture when the folding angle 305 has a value between A3 and A4 (i.e., the foldable device 100 is in the second unstable tent state).

Table 1700 also shows that a multi-segment multi-swipe gesture is a valid input gesture when the folding angle 305 has a value between A4 and 180° (i.e., when the foldable device 100 in the unfolded state), in which case a software application or the OS running on the foldable device 100 performs an action associated with the multi-segment multi-swipe gesture. In this embodiment, the action associated with the cross-segment compound swipe gesture may be the same action that is associated with the regular two-finger swipe by a conventional operating system, such as the Android™ OS.

FIG. 18 shows a Table 1800 for a rotation gesture for each of five pre-defined ranges of a folding angle 305 shown in FIG. 4. Table 1800 includes a row corresponding to each of five pre-defined ranges of a folding angle 305 (i.e., five states of the folding device) shown in FIG. 4. Table 1800 shows, for each of the five pre-defined ranges of a folding angle 305, whether a rotation gesture is a valid gesture (denoted by YES) or invalid (denoted by NO) when the rotation is detected on one the first and second display segments 301, 302 (as shown in the column with the heading "MAIN SEGMENTS (301, 302))" or when rotation gesture is detected on edge display segment 303 (as shown in the column with the heading "EDGE (303))". Table 1800 also shows, for each of the five pre-defined ranges of a folding angle 305, an action performed by a software application or OS running on the foldable device 100 when the rotation gesture is a valid input gesture and detected on one of the first and second display segments 301, 302 (as shown in the column with the heading "USE CASE EXMAPLE" adjacent to the column with the heading "MAIN SEGMENTS (301, 302)") or an action performed by a software application or OS running on the foldable device 100 when the rotation gesture is a valid input gesture and detected on the edge display segment 303 (as shown in the column with the heading "USE CASE EXMAPLE" adjacent to the column with the heading "EDGE (303))".

Table 1800 shows that a rotation gesture is an invalid input gesture when the folding angle 305 has a value between 0° and A1 (i.e., when the foldable device 100 is in the folded state). Table 1800 also shows that a rotation gesture is a valid input gesture when the folding angle 305 has a value between A1 and A2 (when A2≤90°) (i.e., when the foldable device 100 is in the first unstable tent state) and when the rotation gesture is wholly detected on one of the first display segment 301 and the second 302 display segment), in which case a software application running on the foldable device performs (e.g., a photo application) performs an action associated with the rotation gesture for the one of the first and second display segments 301, 302 the rotation gesture is detected on (e.g., to rotate a photo rendered on one of the first and second display segments 301, 302).

Table 1800 also shows that a rotation gesture is a valid input gesture when the folding angle 305 has a value between A2 and A3 (when A3≥90°) (i.e., when the foldable device 100 is in the stable tent state) and when the rotation gesture is wholly detected on one of the first display segment 301 and the second 302 display segment), in which case a software application running on the foldable device performs (e.g., a photo application) performs an action associated with the rotation gesture for the one of the first and second display segments 301, 302 the rotation gesture is detected on (e.g., to rotate a photo rendered on one of the first and second display segments 301, 302).

Table 1800 also shows that a rotation gesture is a valid input gesture when the folding angle 305 has a value between A2 and A3 (when A3≥90°) (i.e., when the foldable device 100 is in the stable tent state) and when the rotation gesture is wholly detected on the edge display segment 303, in which case a software application or the OS running on the foldable device 100 performs an action associated with a rotation gesture for the edge display segment 303. For example, the OS may associate an action with the rotation gesture for the edge display segment that causes a GUI rendered on the first display segment 301 to be swapped with a GUI rendered on the second display segment 302 or vice versa.

Table 1800 also shows that a rotation gesture is a valid input gesture when the folding angle 305 has a value between A3 and A4 (i.e., the foldable device 100 is in the first unstable tent state) and when the rotation gesture is wholly detected on one of the first 301 and second 302 display segments, in which case a software application or the OS running on the foldable device 100 performs an action associated with the rotation gesture for the one of the first and second display segments 301, 302. For example, the OS may associate an action with the rotation gesture for the one of the first and second display segments 301, 302 that causes the OS to switch from rendering content of a first software application running on the foldable device 100 on the one of the first and display segments 301, 302 to rendering content of a second software application.

Table 1800 also shows that a rotation gesture is a valid gesture when the folding angle 305 has a value between A3 and A4 and when the rotation gesture is wholly detected on the edge display segment 303, in which case the OS performs an action that includes swapping the UI rendered on the first display segment 301 with the UI rendered on the second display segment 302 or vice versa.

Table 1800 also shows that a rotation gesture is a valid input gesture when the folding angle 305 has a value between A4 and 180° (e.g., when the foldable device 100 is in the unfolded state) and when the rotation gesture is wholly detected on one of the first 301 and second 302 display segments, in which case a software application running on the foldable device performs (e.g., a photo application) performs an action associated with the rotation gesture for the one of the first and second display segments 301, 302 the rotation gesture is detected on (e.g., to rotate a photo rendered on one of the first and second display segments 301, 302).

Table 1800 also shows that a rotation gesture is a valid input gesture when the folding angle 305 has a value between A4 and 180° (e.g., when the foldable device 100 is in the unfolded state) and when the rotation gesture is wholly detected on the edge display segment 303, in which case a software application running on the foldable device performs (e.g., a photo application) performs an action associated with the rotation gesture for the edge display segment 303 the rotation gesture is detected on (e.g., to rotate a photo rendered on the edge display segment 303).

Figure 19:
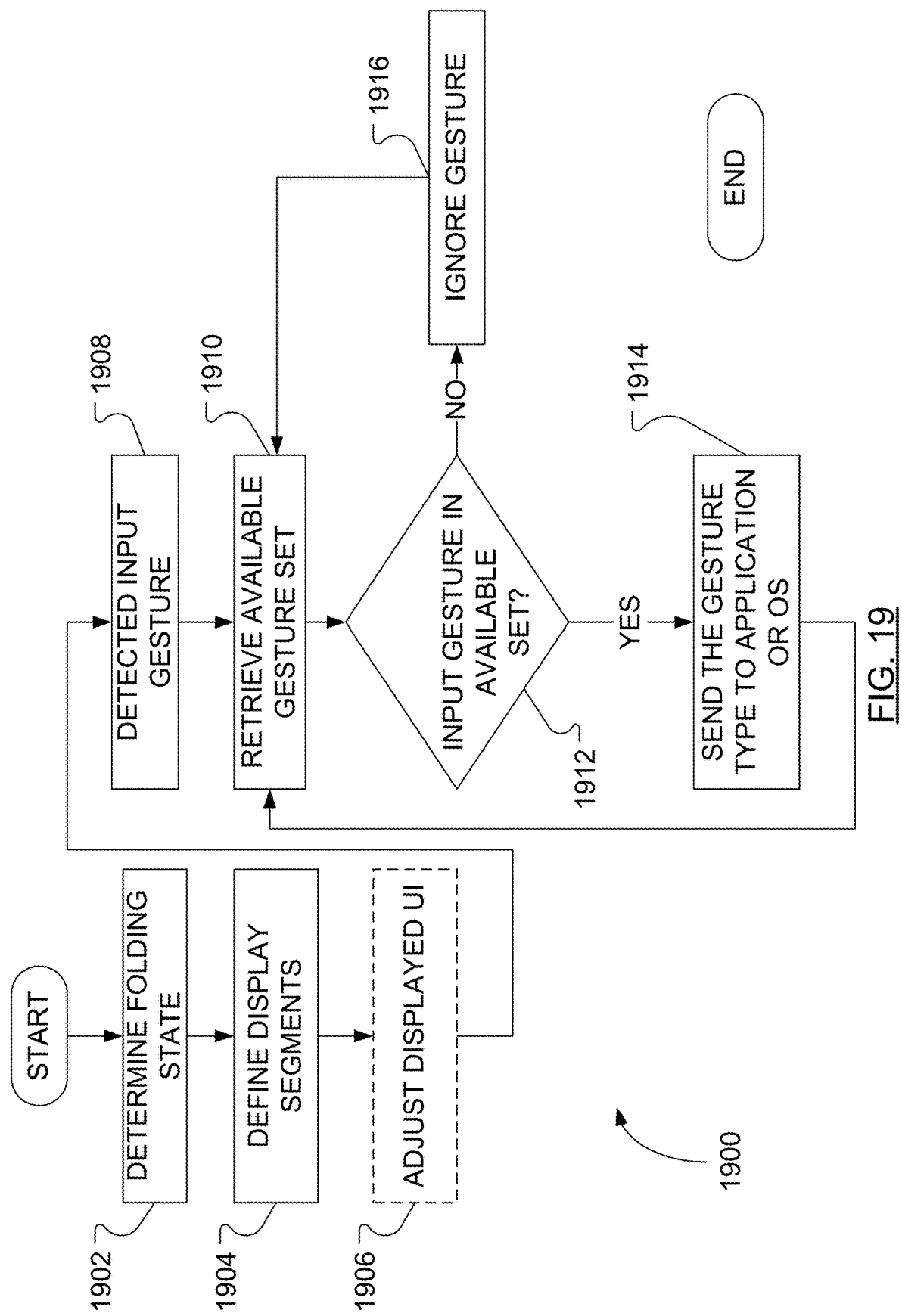
FIG. 19 illustrates a flowchart a method performed by the foldable device in accordance with aspects of the present application.

FIG. 19 illustrates an example embodiment of a method 1900 performed by the foldable device 100 in accordance with aspects of the present application. The method 1900 may be implemented in software, such as an operating system of foldable device 100 that includes the gesture recognition system 206. The software includes computer-readable instructions that are stored in memory 204 of the foldable device 100 and are executable by the processor 202 of the foldable device 100. Coding of the software for carrying out the method 1900 is well within the scope of a person of ordinary skill in the art having regard to the present disclosure. The method 1900 may contain additional or fewer actions than shown or described, and the actions may be performed in a different order. In some embodiments, the computer-readable instructions of the software that implements the method 1900 may be stored in a computer-readable medium. It will be appreciated that the method 1900 need not be performed in the exact sequence indicated in FIG. 19 and that various actions of the method 1900 may be performed in parallel rather than in sequence.

The method 1900 begins at action 1902. At action 1902, the processor 202 receives data indicative of the folding angle 305 of the foldable device 100 from the fold detector 208 and determines a folding state of the foldable device 100 based on the data indicative of the folding angle 305 of the foldable device 100. The processor 202 may transmit, to the fold detector 208, a request for the folding angle 305 and receive, in response, receive data indicating of a value for the folding angle 305. Alternatively, the fold detector 208 may continuously monitor the folding angle 305 and periodically transmit, to the processor 202, data indicative of an updated value for the folding angle 305. In some examples, the fold detector 208 may transmit data indicative of the value of the folding angle 305 only when there has been a significant change (e.g., a change of more than 5 degrees) in the detected folding angle 305.

In one implementation of the fold detector 208, the fold detector 208 detects a folding angle 305 by sensing proximity of one part of one (non-display) side of the foldable device 100 from the other side of the foldable device 100.

In another implementation of the fold detector 208, the fold detector 208 detects a folding angle 305 using an optical means. In another implementation of the fold detector 208, the fold detector 208 detects a folding angle 305 using a form of radar.

In yet another implementation of the fold detector 208, the fold detector 208 may detect a folding angle 305 using a proximity or depth sensor having a signal transmitter-receiver pair. In some embodiments, the fold detector 208 may use electronic data from one or more sensors on the foldable device 100, such as an accelerometer and/or a gyroscope sensor, to determine a folding angle 305 based on an orientation of the foldable device 100.

In still another implementation of the fold detector 208, the fold detector 208 may detect a folding angle 305 using a flex sensor, which can be attached along a foldable edge of the foldable device 100 (e.g., along the non-display side of the edge display segment 303). As the foldable device 100 is folded, the flex sensor can measure an amount of deflection or bending based on a resistance reading, which is proportional to how much the flex sensor is bent as part of the foldable edge of the foldable device 100.

Based on the detected folding angle 305, the gesture recognition system 206 may determine the folding state (e.g., as illustrated in FIG. 4) of the foldable device 100.

The method then proceeds to action 1904. At action 1904, the processor 202 defines one or more display segments 301, 302 and 303, based on the detected folding angle 305. That is, the processor 202 may determine the placement of the first border 313 and the second border 323. Notably, the borders 313, 323 need not necessarily be straight. Further, depending on the folding angle 305 of the foldable device 100, there may not be a need to define the segments 301, 302, 303 and the border 313, 323. For example, when the foldable device 100 is in the unfolded state the flexible display screen 102 may not need to be controlled as a segmented display.

At 1906, the processor 202, as an optional step, adjust a graphical user interface (GUI) rendered on the three display segments 301, 302, 303 based on the folding state of the foldable device 100. In some embodiments, to ensure the visibility of UI elements rendered in the GUI on the edge display segment 303, the software application or the OS running on the foldable device 100 may dynamically adjust the position, orientation or visual appearance of UI elements based on the folding state of the foldable device 100. For example, one or more GUI controls may be rendered on the edge display section 303 for the user to control the foldable device 100 when the OS receives a state information that indicates that the foldable device 100 is in a tent state.

The method 1900 then proceeds to action 1908. At 1908, the processor 202 may detect an input gesture on a display segment 301, 302, 303 of the foldable device 100 and determine whether the input gesture is a simple input gesture or a complex input gesture. For example the processor 202 can track a user's finger movements across one or more of the display segments 301, 302, 303 of the foldable device 100 in order to determine input parameters such as number of fingers, direction, force magnitude, velocity, and duration of touches for the detected input gesture. These input parameters can be used to determine whether the detected input gesture is a simple input gesture or complex input gesture. The input parameters may also be used to determine a gesture type that corresponds to the detected input gesture. In some embodiments, the detected input gesture may be determined, based on the input parameters, to be a simple input gesture that corresponds to one of the following gesture types: a tap gesture; a hard tap gesture; a rotation gesture; a pinch gesture; or a zoom gesture. In some embodiments, the detected input gesture may be determined, based on the input parameters, to be a complex input gesture that corresponds to one of the following complex input gestures types: cross-segment single swipe, cross-segment double swipe, cross-segment compound swipe, and multi-segment swipe. In some embodiments, a complex input gesture may be detected by tracking individual swiping gestures across one or more of the first, second and edge display segments 301, 302, 303.

The method 1900 then proceeds to action 1910. At action 1910, the processor 202 retrieves from memory 204 the set of available input gestures corresponding to the folding state of the foldable device 100 (i.e. the set of available input gestures corresponding to the range of folding angle within which the folding angle of the foldable device 100 is within). In some embodiments, the set of available input gesture retrieved from memory 204 includes the first and second subsets of available input gestures corresponding to the folding state of the foldable device 100.

The method 1900 then proceeds to action 1912. At action 1912, the processor 202 determines whether the detected input gesture is a valid input gesture or invalid input gesture. When the detected input gesture is determined to be a simple input gesture at action 1908, the processor 202 determines whether the gesture type that corresponds to the detected input gesture is a valid input gesture or an invalid input gesture as follows. First, the processor 202 determines which display segment of the first, second, and third display segments 301, 302, 303 the detected simple input gesture was detected on. When the detected simple input gesture is determined to be detected on one of the first and second display segments 301, 302, the processor 202 determines whether the gesture type corresponding to the detected simple input gesture is included in in the first subset of available input gestures corresponding to the determined folding state of the foldable device 100. When the processor 202 determines that the gesture type corresponding to the simple input gesture is included in the first subset of available input gestures corresponding to the determined folding state of the foldable device 100, the processor determines that detected simple input gesture is a valid input gesture and the method proceeds to action 1914.

When the simple input gesture is determined to be detected on the edge display segment 303, the processor 202 determines whether the gesture type corresponding to the simple input gesture is included in the second subset of available input gestures corresponding to the determined folding state of the foldable device 100. When the processor 202 determines that the gesture type corresponding to the detect simple input gesture is included in the second subset of available input gestures corresponding to the determined folding state of the foldable device 100, the processor 202 determines that the detected simple input gesture is a valid input gesture and the method proceeds to action 1914.

When the simple input gesture is determined to be detected on one of the first and second display segments 301, 302 and the processor 202 determines that the gesture type corresponding to the simple input gesture in not included in the first subset of available input gestures corresponding to the determined folding state of the foldable device 100, the processor 202 determines that the detected simple input gesture is an invalid input gesture and the method proceeds to action 1916.

When the simple input gesture is determined to be detected on the edge display segment 303 and the processor 202 determines that the gesture type corresponding to the simple input gesture in not included in the second subset of available input gestures corresponding to the determined folding state of the foldable device 100, the processor 202 determines that the detected simple input gesture is an invalid input gesture and the method proceeds to action 1916.

When the detected input gesture is determined to be a complex input gesture at action 1908, the processor 202 determines whether the gesture type that corresponds to the detected complex input gesture is a valid input gesture or an invalid input gesture at action 1912 as follows. First the processor 202 retrieves the set of available input gestures corresponding to the determined folding state of the foldable device 100. The processor 202 then determines whether the detected complex input gesture corresponding to the complex input gesture is included in the set of available input gestures corresponding to the determined folding state of the foldable device 100. When the processor 202 determines that the gesture type corresponding to the complex input gesture is included in the set of available input gestures corresponding to the determined folding state of the foldable device 100, the processor 202 determines that detected complex input gesture is a valid input gesture and the method proceed to action 1914. When the processor 202 determines that the gesture type corresponding to the complex input gesture is not included in the set of available input gestures corresponding to the determined folding state of the foldable device 100, the processor 202 determines that detected complex input gesture is an invalid input gesture and the method proceed to action 1916.

At action 1914, the processor 202, upon determining that the detected input gesture is a valid input gesture, provides the gesture type corresponding to the detected input gesture, the folding state of the foldable device 100, and the display information to a software application or OS running on the foldable device 100 as described above. The software application or the OS running on the foldable device 100, upon receipt of gesture type corresponding to the detected input gesture, the folding state of the foldable device, and the display information determines a an action to be performed based on the gesture type corresponding to the detected gesture, the folding state of the foldable device 100, and the display information. That is, the processor 202 may carry out whatever action that is associated with the gesture type corresponding to the detected input gesture based on the folding state of the foldable device 100 and the display information, as described above in relation to FIGS. 5-8, 11, 13, 15 and 17.

In some embodiments, UI elements rendered on the display segment(s) 301, 302, 303 on which the valid gesture has just been detected are adjusted to respond to the valid input gesture, while the UI elements in the other segment(s) remain unchanged. For instance, upon receiving a swipe gesture on edge display segment 303, only UI elements rendered on the edge display segment 303 are modified in response to the detected valid input gesture and the first and second segments 301 and 302 remain unchanged. As another example, if a cross-segment double swipe gesture (see e.g. FIG. 12) is detected on the first display segment 301 and the edge display segment 303 and the cross-segment double swipe gesture is determined to be a valid input gesture, upon receipt of the cross-segment double swipe gesture and state information indicative of the folding state of the foldable device, 100, a software application or the OS running on the foldable device 100 may adjust UI elements rendered on the two first display segments 301, 303. The UI elements render in the GUI on the second segment 302 remain unchanged.

At action 1916, upon determining (at action 1912) that the detected gesture is not included the set of available input gestures corresponding to the folding state 100, the processor 202 ignores the detected input gesture (i.e., the gesture type corresponding to the detected input gesture is not provided to a software application or the OS running on the foldable device 100).

Next, the method 1900 may proceed to detect the next input gesture (e.g. a second input gesture) at action 1910, and proceed to determine, at 1912, whether the second input gesture is included in the set of available input gestures corresponding to the folding state of the foldable device 100. This process (i.e., steps 1910 to 1914 or 1916) can be iterative and repeated each time a new input gesture is detected by the processor 202.

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

What is claimed is:

1. A method comprising:
   determining a folding state of a foldable device having a flexible display screen on a display side of the foldable device, the determined folding state being determined based on a folding angle of the foldable device being within a range of folding angles defined for the determined folding state, wherein the folding angle of the foldable device is defined as an angle between a first portion and a second portion of a back side of the foldable device opposing the display side;
   wherein the flexible display screen comprises at least two touch-sensitive display segments, each touch-sensitive display segment being defined relative to a fold edge of the foldable device, the at least two touch-sensitive display segments being located on opposite sides of the fold edge;
   wherein the determined folding state is
   a self-standing tent state in which the foldable device and the flexible display screen are folded at the fold edge to expose the flexible display screen, the first and second portions of the back side of the foldable device are brought towards each other, and the folding angle is between a first angle greater than 0 degrees and a second angle less than 180 degrees;
   rendering respective content to be displayed on each respective one of the at least two touch-sensitive display segments when the foldable device is in the self-standing tent state, each respective one of the at least two touch-sensitive display segments each being configured to detect respective input gestures when the foldable device is in the self-standing tent state;
   detecting a first input gesture when the foldable device is in the self-standing tent state, the first input gesture comprising two simultaneous swipes, each swipe being detected on respective different ones of the at least two touch-sensitive display segments; and providing a gesture type corresponding to the detected first input gesture, the folding state of the foldable device, and display information to a software application or an operating system of the foldable device.

2. The method of claim 1, further comprising:

determining the gesture type corresponding to the detected first input gesture;

determining, based on a combination of the determined gesture type and the determined folding state, that the first input gesture is a valid gesture; and performing the providing responsive to determining that the detected first input gesture is a valid gesture.

3. The method of claim 2, wherein determining that the detected first input gesture is a valid input gesture comprises:

retrieving a set of available input gestures corresponding to the determined folding state of the foldable device; and determining that the detected first input gesture is a valid input gesture in response to determining that the determined gesture type of the detected first input gesture is included in the set of available input gestures corresponding to the determined folding state of the foldable device.

4. The method of claim 1, wherein at least one of the two simultaneous swipes is a cross-segment swipe that traverses a plurality of the at least two or more touch-sensitive display segments.

5. The method of claim 1, wherein detecting the first input gesture comprises detecting input parameters for the detected first input gesture, and wherein the gesture type corresponding to the detected first input gesture is determined based on input parameters for the detected first input gesture.

6. The method of claim 1, wherein the flexible display screen comprises at least three touch-sensitive display segments including:

a first touch-sensitive display segment defined between an edge of the flexible display screen and a first border spaced from the fold edge, the first touch-sensitive display segment being defined to exclude the fold edge;

a second touch-sensitive display segment defined between the first border and a second border spaced from the fold edge, the second touch-sensitive display segment being defined to include the fold edge; and a third touch-sensitive display segment defined between the second border and an opposite edge of the flexible display screen.

7. The method of claim 6, wherein the first input gesture comprises a first swipe detected on the first touch-sensitive display segment and a second swipe detected on the second touch-sensitive display segment, the first and the second swipes being detected simultaneously.

8. The method of claim 1, wherein at least one of the two simultaneous swipes traverses two or more of the at least two touch-sensitive display segments.

9. A foldable device comprising:

a fold detector configured to detect a folding angle for the foldable device;

a flexible display screen on a display side of the foldable device, the flexible display screen comprising at least two touch-sensitive display segments, each touch-sensitive display segment being defined relative to a fold edge of the foldable device, the at least two touch-sensitive display segments being located on opposite sides of the fold edge;

a processor; and a memory storing instructions which, when executed by the processor cause the foldable device to:

determine a folding state of the foldable device, the determined folding state being determined based on the folding angle of the foldable device being within a range of folding angles defined for the determined folding state, wherein the folding angle of the foldable device is defined as an angle between a first portion and a second portion of a back side of the foldable device opposing the display side;

wherein the determined folding state is a self-standing tent state in which the foldable device and the flexible display screen are folded at the fold edge to expose the flexible display screen, the first and second portions of the back side of the foldable device are brought towards each other, and the folding angle is between a first angle greater than 0 degrees and a second angle less than 180 degrees;

render respective content to be displayed on each respective one of the at least two touch-sensitive display segments when the foldable device is in the self-standing tent state, each respective one of the at least two touch-sensitive display segments each being configured to detect respective input gestures when the foldable device is in the self-standing tent state;

detect a first input gesture when the foldable device is in the self-standing tent state, the first input gesture comprising two simultaneous swipes, each swipe being detected on respective different ones of the at least two touch-sensitive display segments of; and provide a gesture type corresponding to the detected gesture, the folding state of the foldable device, and display information to a software application or an operating system of the foldable device.

10. The foldable device of claim 9, wherein the memory stores further instructions which, when executed by the processor, cause the foldable device to:

determine the gesture type corresponding to the detected first input gesture;

determine, based on a combination of the determined gesture type and the determined folding state, that the first input gesture is a valid gesture; and perform the providing responsive to a determination that the detected first input gesture is a valid gesture.

11. The foldable device of claim 10, wherein determining that the detected first input gesture is a valid input gesture comprises:

retrieving a set of available input gestures corresponding to the determined folding state of the foldable device; and determining that the detected first input gesture is a valid input gesture in response to determining that the determined gesture type of the detected first input gesture is included in the set of available input gestures corresponding to the determined folding state of the foldable device.

12. The foldable device of claim 9, wherein at least one of the two simultaneous swipes is a cross-segment swipe that traverses a plurality of the at least two or more touch-sensitive display segments.

13. The foldable device of claim 9, wherein the first input gesture is detected by detecting input parameters for the detected first input gesture, and wherein the gesture type corresponding to the detected first input gesture is determined based on input parameters for the detected first input gesture.

14. The foldable device of claim 9, wherein the flexible display screen comprises at least three touch-sensitive display segments including:
a first touch-sensitive display segment defined between an edge of the flexible display screen and a first border spaced from the fold edge, the first touch-sensitive display segment being defined to exclude the fold edge;
a second touch-sensitive display segment defined between the first border and a second border spaced from the fold edge, the second touch-sensitive display segment being defined to include the fold edge; and
a third touch-sensitive display segment defined between the second border and an opposite edge of the flexible display screen.

15. The foldable device of claim 14, wherein the first input gesture comprises a first swipe detected on the first touch-sensitive display segment and a second swipe detected on the second touch-sensitive display segment, the first and the second swipes being detected simultaneously.

16. The foldable device of claim 9, wherein at least one of the two simultaneous swipes traverses two or more of the at least two touch-sensitive display segments.

17. A non-transitory computer-readable medium storing instructions which, when executed by a processor of a foldable device cause the foldable device to:
determine a folding state of a foldable device having a flexible display screen on a display side of the foldable device, the determined folding state being determined based on a folding angle of the foldable device being within a range of folding angles defined for the determined folding state, wherein the folding angle of the foldable device is defined as an angle between a first portion and a second portion of a back side of the foldable device opposing the display side;
wherein the flexible display screen comprises at least two touch-sensitive display segments, each touch-sensitive display segment being defined relative to a fold edge of the foldable device, the at least two touch-sensitive display segments being located on opposite sides of the fold edge;
wherein the determined folding state is
a self-standing tent state in which the foldable device and the flexible display screen are folded at the fold edge to expose the flexible display screen, the first and second portions of the back side of the foldable device are brought towards each other, and the folding angle is between a first angle greater than 0 degrees and a second angle less than 180 degrees;
render respective content to be displayed on each respective one of the at least two touch-sensitive display segments when the foldable device is in the self-standing tent state, each respective one of the at least two touch-sensitive display segments each being configured to detect respective input gestures when the foldable device is in the self-standing tent state;
detect a first input gesture when the foldable device is in the self-standing tent state, the first input gesture comprising two simultaneous swipes, each swipe being detected on respective different ones of the at least two touch-sensitive display segments; and
provide a gesture type corresponding to the detected gesture, the folding state of the foldable device, and display information to a software application or an operating system of the foldable device.

18. The non-transitory computer-readable medium of claim 17, wherein the instructions further cause the foldable device to:
determine that the detected first input gesture is a valid input gesture by:
retrieving a set of available input gestures corresponding to the determined folding state of the foldable device; and
determining that the detected first input gesture is a valid input gesture in response to determining that the determined gesture type of the detected first input gesture is included in the set of available input gestures corresponding to the determined folding state of the foldable device.

19. The non-transitory computer-readable medium of claim 17, wherein the flexible display screen comprises at least three touch-sensitive display segments including:
a first touch-sensitive display segment defined between an edge of the flexible display screen and a first border spaced from the fold edge, the first touch-sensitive display segment being defined to exclude the fold edge;
a second touch-sensitive display segment defined between the first border and a second border spaced from the fold edge, the second touch-sensitive display segment being defined to include the fold edge; and
a third touch-sensitive display segment defined between the second border and an opposite edge of the flexible display screen.

20. The non-transitory computer-readable medium of claim 17, wherein at least one of the two simultaneous swipes traverses two or more of the at least two touch-sensitive display segments.

* * * * *